(12) United States Patent
Lin et al.

(10) Patent No.: US 12,615,408 B2
(45) Date of Patent: Apr. 28, 2026

(54) VIDEO-BASED INTERACTION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Xiaoxiao Lin, Shenzhen (CN); Jiandong Liu, Shenzhen (CN); Youhua He, Shenzhen (CN); Yibin Zhang, Shenzhen (CN); Yihong Cai, Shenzhen (CN); Dingpan Chen, Shenzhen (CN); Kongkang Zhu, Shenzhen (CN); Xiangbao Su, Shenzhen (CN); Xiaohui Xie, Shenzhen (CN); Hao Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 197 days.

(21) Appl. No.: 18/643,614

(22) Filed: Apr. 23, 2024

(65) Prior Publication Data

US 2024/0276058 A1 Aug. 15, 2024

Related U.S. Application Data

(63) Continuation of application No. PCT/CN2023/088265, filed on Apr. 14, 2023.

(30) Foreign Application Priority Data

Oct. 12, 2022 (CN) .......................... 202211245289.4

(51) Int. Cl.
*H04N 21/431* (2011.01)
*G06T 5/77* (2024.01)
(Continued)

(52) U.S. Cl.
CPC ........... *H04N 21/4316* (2013.01); *G06T 5/77* (2024.01); *H04N 21/44008* (2013.01);
(Continued)

(58) Field of Classification Search
CPC ......... H04N 21/4316; H04N 21/44008; H04N 21/462; H04N 21/4882; H04N 21/431;
(Continued)

(56) References Cited

U.S. PATENT DOCUMENTS 10,045,091 B1 * 8/2018 Nijim .................. H04N 21/4725
2008/0174121 A1 * 7/2008 Wattenbarger .......... F03G 7/111
310/152

(Continued)

FOREIGN PATENT DOCUMENTS

CN 111209437 A 5/2020
CN 111866548 A 10/2020
(Continued)

OTHER PUBLICATIONS

China National Intellectual Property Administration (CNIPA) Office Action 1 for Application No. 202211245289.4 Dec. 18, 2024 9 Pages (including translation).
(Continued)

*Primary Examiner* — Kunal Langhnoja
(74) *Attorney, Agent, or Firm* — Anova Law Group, PLLC

(57) ABSTRACT

A video-based interaction method includes playing a video on a video playback interface to which a target object is logged in, acquiring a local viewing marking record of the video and scene identifiers of markable scene clips in the video, comparing the local viewing marking record with the scene identifiers to determine an unmarked target scene clip in the video, displaying, in response to playing to the target scene clip and on the video playback interface, a target scene (Continued)

clip marking entry that indicates performing viewing marking on the target scene clip, and displaying a viewing marking credential for the target clip in response to a viewing marking trigger operation on the target scene clip marking entry. The viewing marking credential covers a part of the video playback interface, is an independent operable object, and includes description information of the video and identity information of the target object.

20 Claims, 14 Drawing Sheets

(51) Int. Cl.
   *H04N 21/44*          (2011.01)
   *H04N 21/462*         (2011.01)
   *H04N 21/488*         (2011.01)
(52) U.S. Cl.
   CPC ....... *H04N 21/462* (2013.01); *H04N 21/4882* (2013.01); *G06T 2207/10016* (2013.01); *G06T 2207/20081* (2013.01)
(58) Field of Classification Search
   CPC .................... H04N 21/472; G06T 5/77; G06T 2207/10016; G06T 2207/20081; G06F 3/0481; G06F 3/0482; G06F 3/04842; G06F 9/451; G06F 11/3438; G06F 16/732; G06F 16/74
   See application file for complete search history.

(56) References Cited

U.S. PATENT DOCUMENTS

| | | | | |
|---|---|---|---|---|
| 2009/0019487 | A1* | 1/2009 | Kulas | H04N 21/4722 |
| | | | | 725/41 |
| 2009/0092374 | A1* | 4/2009 | Kulas | H04N 21/6125 |
| | | | | 386/282 |
| 2014/0115477 | A1 | 4/2014 | Pendergast et al. | |
| 2014/0259056 | A1 | 9/2014 | Grusd | |
| 2016/0034147 | A1* | 2/2016 | Chhabra | G06F 3/04842 |
| | | | | 715/836 |
| 2017/0099520 | A1* | 4/2017 | Strickland | G06F 16/7867 |
| 2017/0289619 | A1* | 10/2017 | Xu | H04N 21/25866 |
| 2019/0026367 | A1* | 1/2019 | Boss | G06F 16/7844 |
| 2019/0080175 | A1* | 3/2019 | Buratti | G06V 10/235 |
| 2019/0246165 | A1* | 8/2019 | Brouwer | H04N 21/435 |
| 2023/0276102 | A1* | 8/2023 | Chen | G06T 7/70 |
| | | | | 725/34 |

FOREIGN PATENT DOCUMENTS

| | | |
|---|---|---|
| CN | 112199002 A | 1/2021 |
| CN | 112423087 A | 2/2021 |
| CN | 113705154 A | 11/2021 |
| CN | 115115482 A | 9/2022 |
| CN | 115494987 A | 12/2022 |

OTHER PUBLICATIONS

The World Intellectual Property Organization (WIPO) International Search Report for PCT/CN2023/088265 Jun. 7, 2023 5 Pages (including translation).

Christopher Zach et al., A duality based approach for realtime TV-L1 optical flow. DAGM—Symposium: 214-223, 2007.

Tan J. Goodfellow et al., Generative adversarial networks. Communications of the ACM 63(11): 139-144, 2020.

Jiaxin Li et al., Mine: Towards continuous depth MPI with NeRF for novel view synthesis. ICCV: 12558-12568, 2021.

Ben Mildenhall et al., NeRF: Representing scenes as neural radiance fields for view synthesis. ECCV: 405-421, 2020.

René Ranftl et al., Towards robust monocular depth estimation: Mixing datasets for zero-shot cross-dataset transfer. IEEE Transactions on Pattern Analysis and Machine Intelligence, 44(3): 1623-1637, 2022.

Chris Rockwell et al., PixelSynth: Generating a 3D-consistent experience from a single image. ICCV: 14084-14093, 2021.

Meng-Li Shih et al., 3D photography using context-aware layered depth inpainting. CVPR: 8025-8035, 2020.

Karen Simonyan et al., Two-stream convolutional networks for action recognition in videos. NIPS: 568-576, 2014.

Olivia Wiles et al., SynSin: End-to-end view synthesis from a single image. CVPR: 7465-7475, 2020.

\* cited by examiner

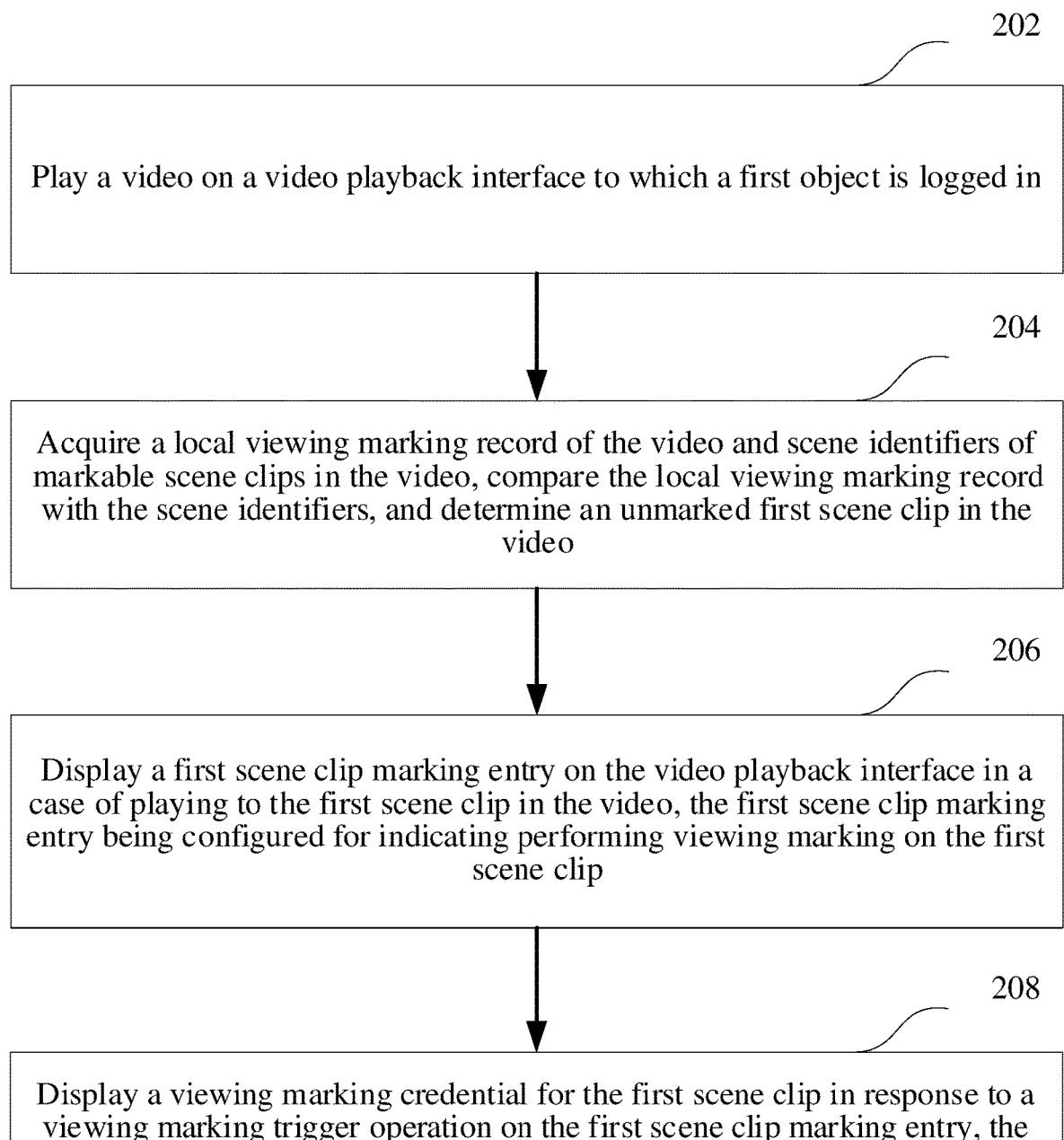

202

Play a video on a video playback interface to which a first object is logged in

204

Acquire a local viewing marking record of the video and scene identifiers of markable scene clips in the video, compare the local viewing marking record with the scene identifiers, and determine an unmarked first scene clip in the video

206

Display a first scene clip marking entry on the video playback interface in a case of playing to the first scene clip in the video, the first scene clip marking entry being configured for indicating performing viewing marking on the first scene clip

208

Display a viewing marking credential for the first scene clip in response to a viewing marking trigger operation on the first scene clip marking entry, the displayed viewing marking credential covering a part of the video playback interface, and the viewing marking credential being an independent operable object, and including description information of the video and identity information of the first object

FIG. 2

Record
viewing entry
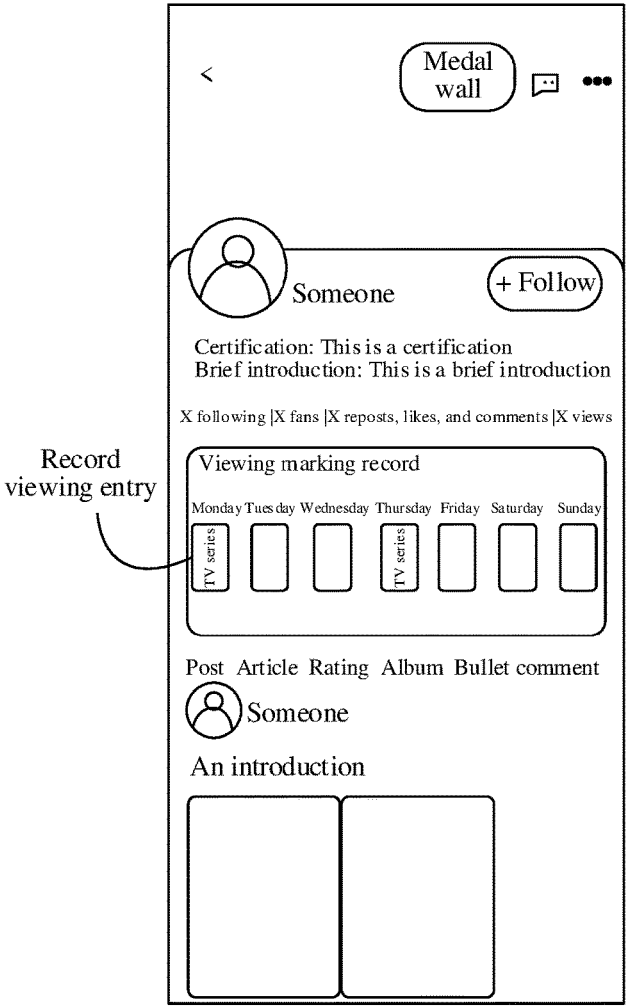
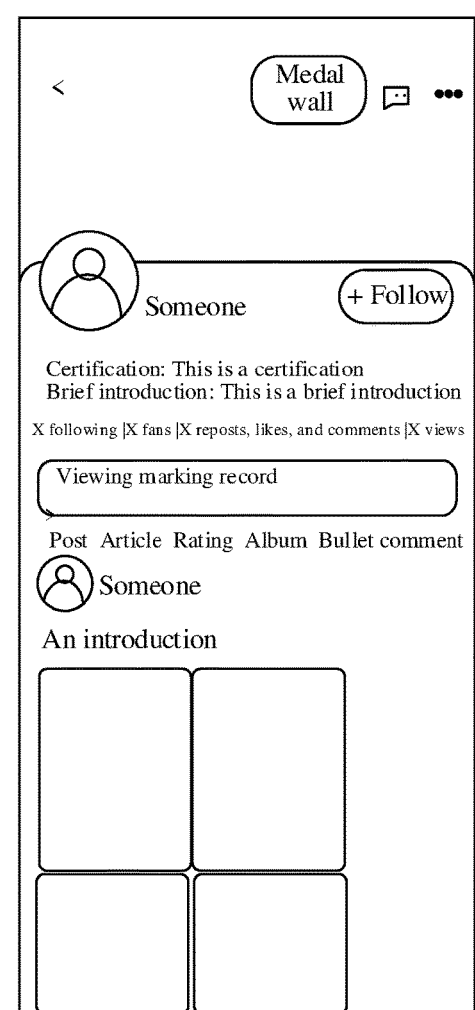
Display a record viewing entry in a case
that a viewing marking record is in a
visible state
Skip displaying the record viewing
entry in a case that the viewing marking
record is in an invisible state
FIG. 9

10-1                              10-2

Targeted video frame | Next temporally adjacent video frame | Optical flow between the two video frames

VIDEO-BASED INTERACTION METHOD AND APPARATUS, COMPUTER DEVICE, AND STORAGE MEDIUM

CROSS-REFERENCE TO RELATED APPLICATIONS

This application is a continuation of International Application No. PCT/CN2023/088265, filed on Apr. 14, 2023, which claims priority to Chinese Patent Application No. 2022112452894, entitled "VIDEO-BASED INTERACTION METHOD AND APPARATUS, COMPUTER DEVICE, STORAGE MEDIUM, AND COMPUTER PROGRAM PRODUCT" filed on Oct. 12, 2022, the entire contents of which are incorporated herein by reference.

FIELD OF THE TECHNOLOGY

This application relates to the field of computer technologies, and in particular, to a video-based interaction method and apparatus, a computer device, a storage medium, and a computer program product.

BACKGROUND OF THE DISCLOSURE

With the development of computer technologies, an increasing number of video applications have appeared, and functions of the video applications have become diversified. When running on a client, a video application has the function to record videos having been played.

In conventional technologies, after a video is played in a video application to which a first object is logged in, the video application will record the video played this time, generate a viewing record of the first object based on a video played each time, and display the viewing record of the first object.

However, in the conventional technologies, during recording of the first object's viewing, only a few recently watched videos are recorded and sorted in a reverse chronological order. The objective is to facilitate continuous viewing of a recently watched video, which is not conducive to finding videos followed by the first object, resulting in low efficiency of searching for the followed videos.

SUMMARY

In accordance with the disclosure, there is provided a video-based interaction method performed by a computer device and including playing a video on a video playback interface to which a target object is logged in, acquiring a local viewing marking record of the video and scene identifiers of markable scene clips in the video, comparing the local viewing marking record with the scene identifiers to determine an unmarked target scene clip in the video, displaying, in response to playing to the target scene clip in the video and on the video playback interface, a target scene clip marking entry that indicates performing viewing marking on the target scene clip, and displaying a viewing marking credential for the target clip in response to a viewing marking trigger operation on the target scene clip marking entry. The viewing marking credential covers a part of the video playback interface. The viewing marking credential is an independent operable object and includes description information of the video and identity information of the target object.

Also in accordance with the disclosure, there is provided a computer device includes one or more memories storing one or more computer-readable instructions, and one or more processors configured to execute the one or more computer-readable instructions to play a video on a video playback interface to which a target object is logged in, acquire a local viewing marking record of the video and scene identifiers of markable scene clips in the video, compare the local viewing marking record with the scene identifiers to determine an unmarked target scene clip in the video, display, in response to playing to the target scene clip in the video and on the video playback interface, a target scene clip marking entry that indicates performing viewing marking on the target scene clip, and display a viewing marking credential for the target clip in response to a viewing marking trigger operation on the target scene clip marking entry. The viewing marking credential covers a part of the video playback interface. The viewing marking credential is an independent operable object and includes description information of the video and identity information of the target object.

Also in accordance with the disclosure, there is provided a non-transitory computer-readable storage medium storing one or more computer-readable instructions that, when executed by one or more processors, cause the one or more processors to play a video on a video playback interface to which a target object is logged in, acquire a local viewing marking record of the video and scene identifiers of markable scene clips in the video, compare the local viewing marking record with the scene identifiers to determine an unmarked target scene clip in the video, display, in response to playing to the target scene clip in the video and on the video playback interface, a target scene clip marking entry that indicates performing viewing marking on the target scene clip, and display a viewing marking credential for the target clip in response to a viewing marking trigger operation on the target scene clip marking entry. The viewing marking credential covers a part of the video playback interface. The viewing marking credential is an independent operable object and includes description information of the video and identity information of the target object.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application.

FIG. 2 is a schematic flowchart of a video-based interaction method according to an embodiment.

FIG. 9 is a schematic diagram of displaying a record viewing entry according to an embodiment.

DESCRIPTION OF EMBODIMENTS

The technical solutions in embodiments of this application are clearly and completely described in the following with reference to the accompanying drawings in the embodiments of this application. Apparently, the embodiments to be described are merely some rather than all of the embodiments of this application. All other embodiments obtained by a person of ordinary skill in the art based on the embodiments of this application without creative efforts shall fall within the protection scope of this application.

Figure 1:
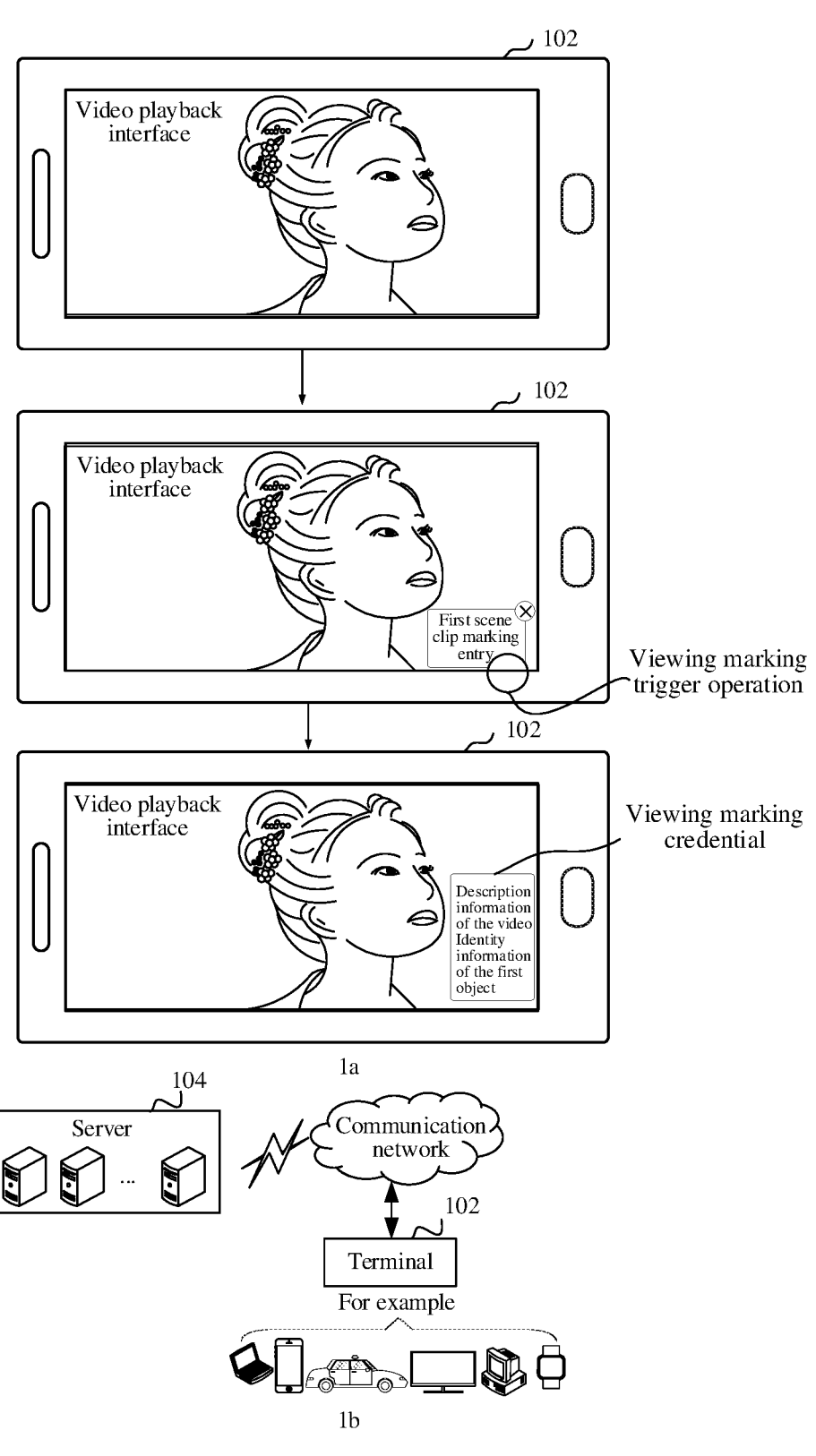
FIG. 1 is a diagram of an application environment of a video-based interaction method according to an embodiment.

A video-based interaction method provided in the embodiments of this application may be applied to an application environment shown in FIG. 1. A client for implementing video-based interaction is installed on a terminal. The client may be a video application, a web client, or a child application running in a running environment of a parent application. In a specific application, as shown in 1a in FIG. 1, a terminal 102 plays a video on a video playback interface to which a first object (also referred to as a "target object") is logged in, acquires a local viewing marking record of the video and scene identifiers of markable scene clips in the video, compares the local viewing marking record with the scene identifiers, determines an unmarked first scene clip in the video, displays a first scene clip marking entry on the video playback interface in a case of playing to the first scene clip in the video, the first scene clip marking entry being configured for indicating performing viewing marking on the first scene clip, and displays a viewing marking credential for the first scene clip in response to a viewing marking trigger operation on the first scene clip marking entry, the displayed viewing marking credential covering a part of the video playback interface, and the viewing marking credential being an independent operable object, and including description information of the video and identity information of the first object. In this disclosure, the first scene clip is also referred to as a "target scene clip." In a specific application, as shown in 1b in FIG. 1, the terminal 102 may acquire scene identifiers of markable scene clips in the video from a server 104.

The terminal 102 may be, but not limited to, any desktop computer, notebook computer, smartphone, tablet computer, Internet of Things device, and portable wearable device. The Internet of Things device may be a smart speaker, a smart television, a smart air conditioner, a smart in-vehicle device, or the like. The portable wearable device may be a smart watch, a smart band, a head-mounted device, or the like. The server 104 may be implemented by an independent server or a server cluster including a plurality of servers.

In an embodiment, as shown in FIG. 2, a video-based interaction method is provided. The method may be performed by a terminal or a server alone, or may be performed by a terminal and a server collaboratively. In this embodiment of this application, a description is provided by using an example in which the method is applied to a terminal. The method includes the following steps:

Step 202: Play a video on a video playback interface to which a first object is logged in.

The first object refers to an object in a logged-in state or a non-logged-in state in the playback process of the video. For example, the first object may specifically refer to an account in a logged-in state in the playback process of the video. In another example, the first object may specifically refer to a user in a logged-in state in the playback process of the video. In another example, the first object may specifically refer to a user in a non-logged-in state in the playback process of the video.

The video playback interface refers to an interface configured to play videos. For example, the video playback interface may specifically refer to an interface configured to play videos in a video application. In another example, the video playback interface may specifically refer to an interface configured to play videos in a web client. The video played on the video playback interface refers to a video related to a movie and television work. For example, the video may specifically be a certain movie. In another example, the video may specifically be a certain episode of a TV series.

Specifically, the terminal plays the video on the video playback interface to which the first object is logged in; In a specific application, the terminal displays a video application interface to which the first object is logged in, at least one playable video being displayed on the video application interface; and in response to a playback trigger event for a video in the at least one playable video, the terminal displays the video playback interface to which the first object is logged in, and plays the video on the video playback interface. In a specific application, the video playback interface may be displayed in full screen on the terminal, filling the entire screen. In a specific application, the video playback interface may alternatively occupy only a part of the screen of the terminal.

Step 204: Acquire a local viewing marking record of the video and scene identifiers of markable scene clips in the video, compare the local viewing marking record with the scene identifiers, and determine an unmarked first scene clip in the video.

The local viewing marking record refers to a locally stored record of viewing marking, including scene identifiers of scenes on which viewing marking has been performed. The scene identifiers of the markable scene clips refer to identifiers of scenes in the video on which viewing marking can be performed. For example, the scene identifiers of the markable scene clips may specifically include a name of a scene in the video on which viewing marking can be performed (that is, a scene name), a time period in which the scene is located, and the like. The first scene clip refers to a pre-selected unmarked famous scene in the video. The term famous scene refers to a classic clip that is well-known in the image world. The elements that form a famous scene are: images with visual tension and having traits that can become the essence of an entire work, era, or event. Famous scene is widely used in the online world, and there is no standard to determine whether it is appropriately used. In this embodiment, the famous scene may be selected according to an actual application scenario.

Specifically, the terminal acquires the local viewing marking record of the video and the scene identifiers of the markable scene clips, can determine, by comparing the local viewing marking record with the scene identifiers, the first scene clip on which no viewing marking has been performed in the video, and then can monitor a playback progress of the video based on the first scene clip.

Step 206: Display a first scene clip marking entry on the video playback interface in a case of playing to the first scene clip in the video, the first scene clip marking entry being configured for indicating performing viewing marking on the first scene clip.

Viewing marking refers to recording a viewing behavior in a viewing process, that is, recording a video watching behavior during playback of the video on the video playback interface. For example, viewing marking may specifically be recording a certain scene clip in the video. For example, viewing marking may specifically be recording a classic scene clip in the video, and the classic scene clip may be configured according to an actual application scenario. In another example, viewing marking may specifically be recording a current playback picture in the video playback process. In another example, viewing marking may specifically be performing episode-based recording on the video, indicating that the video being played has been watched once. For example, when the video is a certain movie, viewing marking may specifically be performing episode-based recording on the movie, indicating that the movie has been watched once. In another example, when the video is a certain episode in a TV series, viewing marking may specifically be performing episode-based recording on the certain episode in the TV series, indicating that the episode has been watched once. The first scene clip marking entry refers to an entry configured for triggering marking on the first scene clip, and is configured for indicating performing viewing marking on the first scene clip in the video. For example, the first scene clip marking entry may specifically be a prompt configured for triggering marking on the first scene clip, indicating that viewing marking can be performed on the first scene clip. In another example, the first scene clip marking entry may specifically be an icon configured for triggering marking on the first scene clip, which may be actively triggered by the user for viewing marking.

Figure 3:
FIG. 3 is a schematic diagram of displaying a first scene clip marking entry according to an embodiment.

Specifically, the terminal displays the first scene clip marking entry on the video playback interface in a case of playing to the first scene clip in the video, the first scene clip marking entry being configured for indicating performing viewing marking on the first scene clip. In a specific application, the first scene clip marking entry displayed on the video playback interface covers a part of the video playback interface and does not affect normal playback of the video. The transparency of the displayed first scene clip marking entry may be configured according to an actual application scenario. In a specific application, as shown in FIG. 3, in the playback process of the video, the terminal displays the first scene clip marking entry on the video playback interface, where the first scene clip marking entry covers a part of the video playback interface, and does not affect the normal playback of the video. In this embodiment, a display position of the first scene clip marking entry is not limited. In a specific application, the first scene clip marking entry may be located at corner positions such as an upper left corner, a lower left corner, an upper right corner, or a lower right corner of the video playback interface. In a specific application, the first scene clip marking entry may be automatically triggered for display along with the playback progress of the video. In a specific application, when the video is played to the first scene clip, the corresponding first scene clip marking entry is displayed on the video playback interface.

In a specific application, a display duration of the first scene clip marking entry may be configured according to an actual application scenario. In a specific application, during recording of the first scene clip in the video, the display duration of the corresponding first scene clip marking entry may be positively correlated with a duration of the first scene clip, that is, a longer duration of the first scene clip indicates a longer display duration of the first scene clip marking entry.

Step 208: Display a viewing marking credential for the first scene clip in response to a viewing marking trigger operation on the first scene clip marking entry, the displayed viewing marking credential covering a part of the video playback interface, and the viewing marking credential being an independent operable object, and including description information of the video and identity information of the first object.

The viewing marking trigger operation refers to an operation that triggers viewing marking. For example, the viewing marking trigger operation may specifically refer to a selection operation on the first scene clip marking entry. For example, the selection operation on the first scene clip marking entry may specifically refer to one of a click/tap operation, a long press operation, or a double-click/tap operation. The viewing marking credential refers to a commemorative credential issued after viewing marking is triggered. For example, the viewing marking credential may specifically refer to a commemorative ticket stub issued after viewing marking is triggered, which is in a form similar to a movie ticket. The independent operable object means that a certain object can be operated as an independent individual, where the operation includes, but not limited to, selecting, deleting, sharing, and the like from one or more objects.

The description information of the video is configured for describing the video. For example, the description information of the video may specifically include a name of a movie and television work, an episode within which the video falls, a video representation image, and the like. The identity information of the first object is configured for describing an identity of the first object. For example, the identity information of the first object may specifically include an identity icon, a nickname of the first object, and the like.

Specifically, if the user chooses to perform viewing marking on the first scene clip, the terminal displays the viewing marking credential for the first scene clip in response to the viewing marking trigger operation on the first scene clip marking entry, the displayed viewing marking credential covering a part of the video playback interface, and the viewing marking credential being an independent operable object, and including the description information of the video and the identity information of the first object. In a specific application, if the first object refers to a user in a non-logged-in state in the playback process of the video, the terminal first displays a login entry in response to a viewing marking trigger operation on the first scene clip marking entry, to instruct the first object to log in to an account thereof, and displays a viewing marking credential for the first scene clip in response to a login trigger event of the first object in a case that the first object logs in to the account thereof.

Figure 4:
FIG. 4 is a schematic diagram of displaying a viewing marking credential according to an embodiment.

In a specific application, as shown in FIG. 4, the terminal displays a viewing marking credential for the first scene clip in response to a selection operation on the first scene clip marking entry, where the displayed viewing marking credential covers a part of the video playback interface, and does not affect the normal playback of the video, that is, the playback of the video will not be interrupted due to the display of the viewing marking credential. The viewing marking credential is an independent operable object, and includes the description information of the video and the identity information of the first object. In this embodiment, a position of the viewing marking credential is not limited. The viewing marking credential may be located at positions such as a left side or a right side of the video playback interface. In a specific application, as shown in FIG. 4, the viewing marking credential is located on the right side of the video playback interface.

In a specific application, in addition to the description information of the video and the identity information of the first object, the viewing marking credential further includes viewing marking correlation information configured for recording a viewing marking behavior, which may specifically include a viewing marking time, a viewing marking number, and a link address of the video targeted by the viewing marking. In a specific application, the link address may specifically be a two-dimensional code image. That is, by scanning the two-dimensional code image, the video targeted by the viewing marking can be jumped to.

Figure 5:
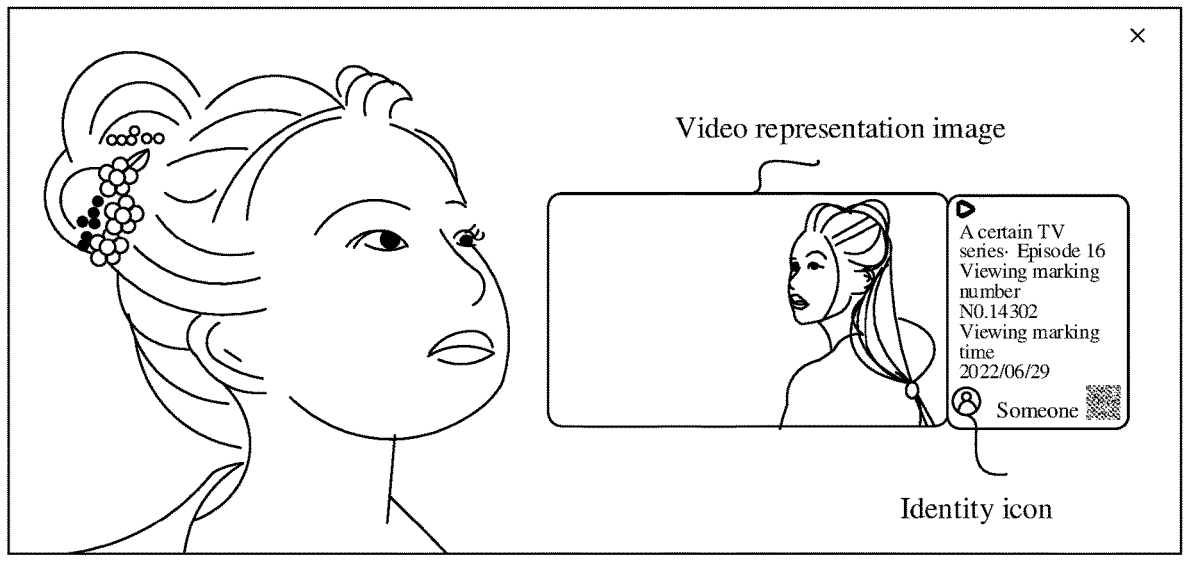
FIG. 5 is a schematic diagram of displaying a viewing marking credential according to another embodiment.

In a specific application, the viewing marking credential may be shown in FIG. 5, including: the description information of the video such as the name of the movie and television work (a certain TV series), the episode within which the video falls (Episode X), and the video representation image; the identity information of the first object such as the identity icon and the nickname of the first object (XXX); and the viewing marking correlation information such as the viewing marking time, the viewing marking number, and the link address of the video targeted by the viewing marking (the two-dimensional code image in FIG. 5).

Figure 6:
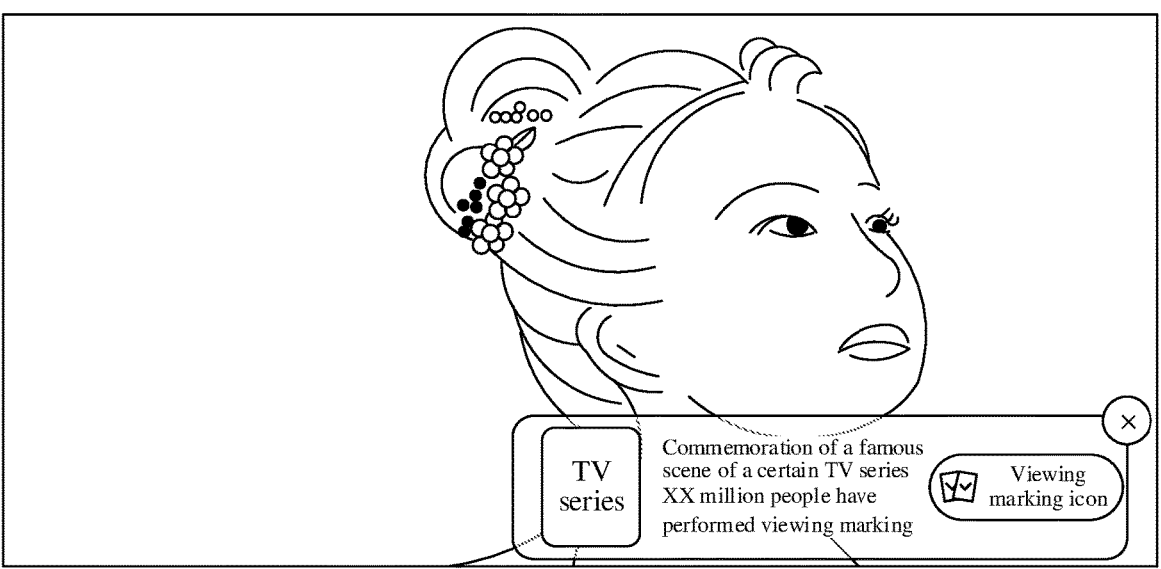
FIG. 6 is a schematic diagram of displaying a first scene clip marking entry according to an embodiment.

In a specific application, displaying the first scene clip marking entry on the video playback interface may be shown in FIG. 6. The displayed first scene clip marking entry includes a first scene clip prompt (commemoration of a famous scene of a certain TV series, XX million people have performed viewing marking) and a viewing marking icon, the first scene clip prompt being configured for prompting that this part is a famous scene, and viewing marking may be performed for commemoration. If the user chooses to perform viewing marking on the first scene clip, the user will select a first scene clip viewing marking icon, and the terminal displays the viewing marking credential for the first scene clip in response to the selection operation on the viewing marking icon.

In the foregoing video-based interaction method, by playing a video on a video playback interface to which a first object is logged in; acquiring a local viewing marking record of the video and scene identifiers of markable scene clips in the video, and comparing the local viewing marking record with the scene identifiers, an unmarked first scene clip in the video can be determined; then when the video is played to the first scene clip, a first scene clip marking entry can be displayed on the video playback interface, which can indicate performing viewing marking on the first scene clip, so that a viewing marking credential for the first scene clip can be displayed in response to a viewing marking trigger operation on the first scene clip marking entry, to implement viewing marking on the first scene clip, the viewing marking credential being an independent operable object, and including description information of the video and identity information of the first object; and by performing viewing marking on the first scene clip, and displaying the viewing marking credential for the first scene clip, accurate recording of the video followed by the first object can be implemented, thereby helping the first object to quickly search for the followed video based on the viewing marking credential, and improving the efficiency of searching for the followed video. In addition, the form of displaying the first scene clip marking entry and displaying the viewing marking credential in response to a first scene clip marking trigger operation can improve the interest of the viewing marking and viewing data; and by displaying the viewing marking credential after providing the viewing marking in the viewing process, memories can be left for the first object's viewing, the user experience can be improved, and the interaction threshold can be lowered, thereby allowing content accumulation on the first object's personal page and strengthening the first object's image.

In an embodiment, the video-based interaction method further includes:

displaying an episode-based viewing marking entry on the video playback interface in a case of playing to a first position (also referred to as a "target position") in the video, the episode-based viewing marking entry being configured for indicating performing viewing marking on an episode within which the video falls; and displaying, in response to a viewing marking trigger operation on the episode-based viewing marking entry, a viewing marking credential for the episode within which the video falls.

The first position refers to a pre-configured position at which the episode-based viewing marking entry is displayed, and may be configured according to an actual application scenario. For example, the first position may specifically refer to a position representing the beginning of the video. For example, the first position may specifically refer to a position at which the video is played for one minute. In another example, the first position may specifically refer to a position at which playback of a title of the video is completed. In another example, the first position may specifically refer to a position representing the end of the video. For example, the first position may specifically refer to a position at which the end of the video is about to be played.

Specifically, the terminal displays the episode-based viewing marking entry on the video playback interface in a case of playing to the first position in the video, the episode-based viewing marking entry being configured for indicating performing viewing marking on the episode within which the video falls; and if the user chooses to perform viewing marking on the episode within which the video falls, the terminal displays a viewing marking credential for the episode within which the video falls in response to a viewing marking trigger operation on the episode-based viewing marking entry.

In a specific application, the displayed viewing marking credential for the episode within which the video falls includes a cumulative quantity of times of viewing marking, that is, a plurality of times of viewing marking on the episode within which the video falls will be displayed on the viewing marking credential through the cumulative quantity of times of viewing marking. For example, if the user has performed viewing marking on the episode within which the video falls for 5 times, the cumulative quantity of times of viewing marking displayed on the viewing marking credential will be 5. In a specific application, for a case of episode-based viewing marking, the quantity of times of viewing marking per day is limited, to facilitate statistics of the viewing marking. For example, for the case of episode-based viewing marking, the quantity of times of viewing marking per day may be limited to one.

In this embodiment, by displaying the episode-based viewing marking entry on the video playback interface in a case of playing to the first position in the video, performing viewing marking on the episode within which the video falls can be indicated, so that the viewing marking credential for the episode within which the video falls can be displayed in response to the viewing marking trigger operation on the episode-based viewing marking entry, thereby implementing episode-based viewing marking.

In an embodiment, the video-based interaction method further includes:

displaying a current playback picture marking entry on the video playback interface in response to a playback control trigger event in a playback process of the video, the current playback picture marking entry being configured for indicating performing viewing marking on a current playback picture; and displaying a viewing marking credential for the current playback picture in response to a viewing marking trigger operation on the current playback picture marking entry.

The playback control trigger event refers to an event configured to trigger playback control. For example, the playback control trigger event may specifically refer to touching the video playback interface in the playback process of the video.

Specifically, in the playback process of the video, if the user intends to perform viewing marking on a current playback picture, the playback control trigger event will be actively triggered. In response to the playback control trigger event, the terminal displays a current playback picture marking entry on the video playback interface, which is configured for indicating performing viewing marking on the current playback picture. If the user chooses to perform viewing marking on the current playback picture, the terminal displays a viewing marking credential for the current playback picture in response to the viewing marking trigger operation on the current playback picture marking entry.

Figure 7:
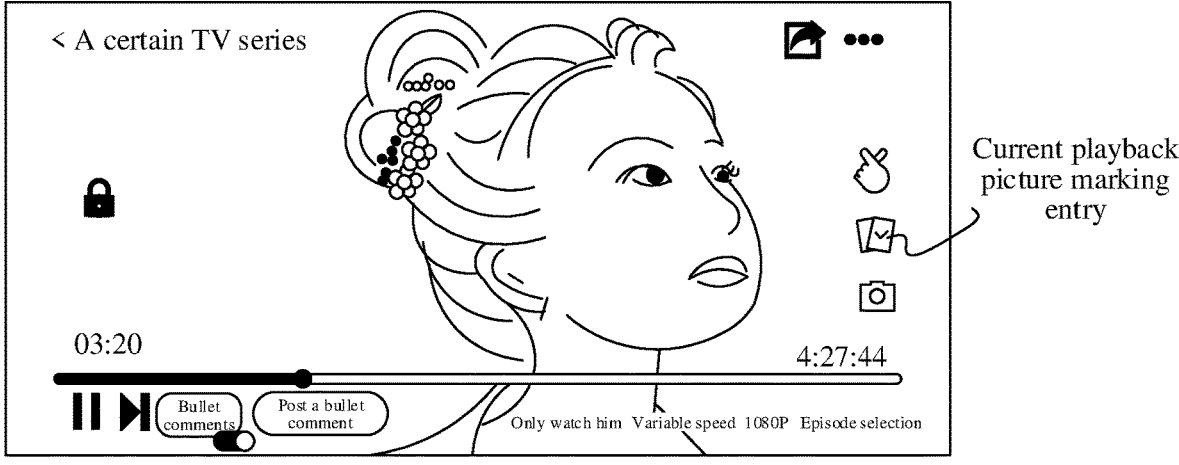
FIG. 7 is a schematic diagram of a displaying a playback control layer according to an embodiment.

In a specific application, in response to the playback control trigger event, the terminal displays a playback control layer including the current playback picture marking entry on the video playback interface, where the playback control layer can be configured to implement playback control such as pause, next episode, variable speed, definition selection, and episode selection. In a specific application, the displayed playback control layer including the current playback picture marking entry may be shown in FIG. 7, which can be configured to implement playback control such as pause, next episode, variable speed, definition selection, episode selection, and only watching one of the characters (that is, "only watch him" in FIG. 7).

In a specific application, the displayed current playback picture marking entry may specifically be a viewing marking icon. If the user chooses to perform viewing marking on the current playback picture, the user may select the viewing marking icon, and the terminal displays the viewing marking credential for the current playback picture in response to the selection operation on the viewing marking icon.

In this embodiment, in the playback process of the video, the current playback picture marking entry is displayed on the video playback interface in response to the playback control trigger event, which can indicates performing viewing marking on the current playback picture, so that the viewing marking credential for the current playback picture can be displayed in response to the viewing marking trigger operation on the current playback picture marking entry, thereby implementing viewing marking on the current playback picture.

In an embodiment, the video-based interaction method further includes:

displaying, in response to a selection operation on the displayed viewing marking credential, obtained credentials for a corresponding work to which the video belongs, and highlighting at least one of the obtained credentials; and highlighting, in response to a credential switch display event, a first credential (also referred to as a "target credential") to which the credential switch display event points.

The selection operation on the displayed viewing marking credential may specifically refer to one of a click/tap operation, a long press operation, or a double-click/tap operation. The corresponding work to which the video belongs refers to a movie and television work to which the video belongs. For example, when the video is a certain movie, the corresponding work to which the video belongs refers to the movie. In another example, when the video is a certain episode of a TV series, the corresponding work to which the video belongs refers to the TV series. The obtained credentials refer to all viewing marking credentials obtained by performing viewing marking on the work to which the video belongs during logging in as the first object, and include at least one credential. The credential switch display event refers to an event of switching the highlighted viewing marking credential. The first credential refers to a viewing marking credential that needs to be highlighted and pointed to by the credential switch display event.

Specifically, the terminal displays, in response to the selection operation on the displayed viewing marking credential, the obtained credentials for the corresponding work to which the video belongs, and highlights at least one of the obtained credentials; and determines, in response to the credential switch display event, the first credential to which the credential switch display event points, and highlights the first credential to which the credential switch display event points. The credential switch display event may specifically be a sliding operation, a click/tap operation, or the like on the obtained credentials.

Figure 8:
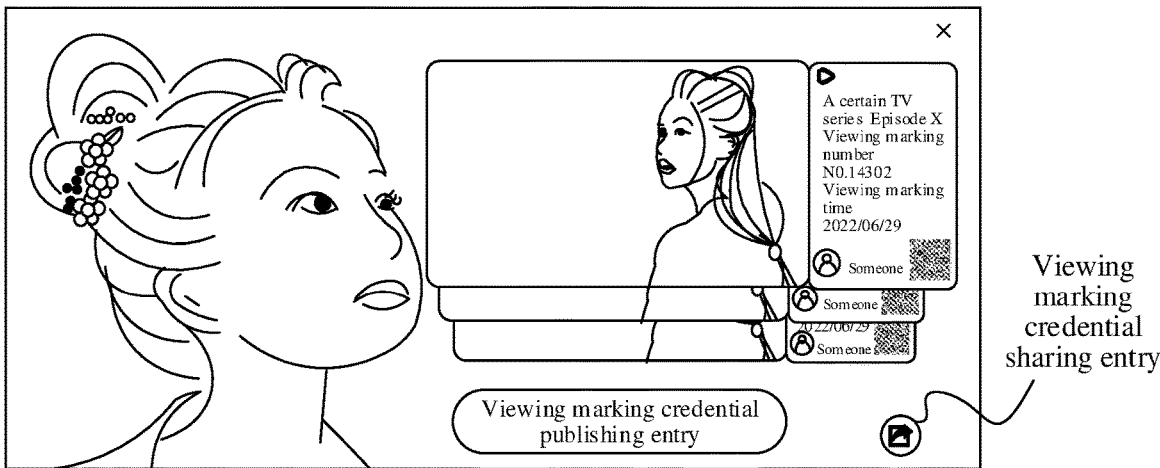
FIG. 8 is a schematic diagram of displaying obtained credentials according to an embodiment.

In a specific application, during displaying of the obtained credentials for the corresponding work to which the video belongs, the displayed obtained credentials may be displayed as a floating layer on the video playback interface. The terminal performs displaying in a reverse order of acquisition times of the viewing marking credentials in the obtained credentials. That is, the latest obtained viewing marking credential is displayed at the front. When at least one of the obtained credentials is highlighted, the quantity of the highlighted viewing marking credentials may be 1, then in a specific application, as shown in FIG. 8, the displayed obtained credentials may be displayed as a floating layer on the video playback interface, and the terminal displays the obtained credentials in a reverse order of acquisition times of the viewing marking credentials, and highlights the latest obtained viewing marking credential.

In a specific application, the credential switch display event may specifically be a sliding operation on the obtained credentials. In response to the sliding operation on the obtained credentials, the terminal highlights the first credential to which the sliding operation points. In a specific application, along with a sliding progress of the sliding operation, the highlighted viewing marking credential may be constantly changed until the sliding operation ends, and the first credential to which the sliding operation points is highlighted.

In this embodiment, by displaying, in response to the selection operation on the displayed viewing marking credential, the obtained credentials of the corresponding work to which the video belongs, and highlighting at least one of the obtained credentials, viewing of the viewing marking status of the work to which the video belongs can be facilitated; and by highlighting, in response to the credential switch display event, the first credential to which the credential switch display event points, further browsing of the viewing marking status of the work to which the video belongs can be facilitated, to implement quick search of the followed video, thereby improving the efficiency of searching for the followed video.

In an embodiment, the video-based interaction method further includes:

displaying a credential interaction entry, the credential interaction entry being configured for prompting interaction with the at least one of the obtained credentials; and interacting, in response to a credential interaction trigger event, with a credential to which the credential interaction trigger event points, and displaying a credential interacted prompt.

The credential interaction entry refers to an entry for interacting with the viewing marking credential, and is configured for prompting interaction with the at least one of the obtained credentials. For example, the credential interaction entry may specifically be a viewing marking credential publishing entry, which is configured for publishing the viewing marking credential, to publish the viewing marking credential to an in-site platform corresponding to the corresponding work to which the video belongs. In another example, the credential interaction entry may specifically be a viewing marking credential sharing entry, which is configured for sharing the viewing marking credential, to share the viewing marking credential to an off-site platform or an in-site platform corresponding to the corresponding work to which the video belongs. For example, the off-site platform may specifically be applications other than the video application. In another example, the credential interaction entry may specifically include a viewing marking credential publishing entry and a viewing marking credential sharing entry, to facilitate the user to publish and share the viewing marking credential.

The credential interacted prompt is configured for prompting that interaction with the viewing marking credential has succeeded. For example, the credential interacted prompt may specifically be a viewing marking credential published prompt, which is generated after the viewing marking credential is published. In another example, the credential interacted prompt may specifically be a viewing marking credential shared prompt, which is generated after the viewing marking credential is shared.

Specifically, in a case of displaying the obtained credentials, the terminal displays the credential interaction entry, the credential interaction entry being configured for prompting interaction with the at least one of the obtained credentials; and interacts, in response to the credential interaction trigger event, with the credential to which the credential interaction trigger event points, and displays a credential interacted prompt when the interaction is completed.

In a specific application, interacting with at least one of the obtained credentials may refer to interacting with the latest viewing marking credential, or may refer to interacting with any viewing marking credential in the obtained credentials. If it refers to interacting with the latest viewing marking credential, regardless of whether the highlighted viewing marking credential is the latest viewing marking credential or not, during responding to the credential interaction trigger event, the credential to which the credential interaction trigger event points is the latest viewing marking credential.

In a specific application, the credential interaction entry includes a viewing marking credential publishing entry and a viewing marking credential sharing entry, and the user may publish and share viewing marking credentials. When the user publishes a viewing marking credential, the terminal publishes, in response to a viewing marking credential publishing trigger event, the viewing marking credential to which the viewing marking credential publishing trigger event points, and displays a viewing marking credential published prompt when the publishing is completed. When the user shares a viewing marking credential, the terminal shares, in response to a viewing marking credential sharing trigger event, the viewing marking credential to which the viewing marking credential sharing trigger event points, and displays a viewing marking credential shared prompt when the sharing is completed.

In a specific application, the viewing marking credential publishing trigger event may specifically be a selection operation on the viewing marking credential publishing entry. In response to the selection operation on the viewing marking credential publishing entry, the terminal calls a corresponding in-frame publisher to guide the user to publish the obtained viewing marking credential as a post that can be displayed on an in-site platform. In a specific application, the viewing marking credential sharing trigger event may specifically be a selection operation on the viewing marking credential sharing entry. In response to the selection operation on the viewing marking credential sharing entry, the terminal pulls up an in-frame sharing floating layer to support sharing of the viewing marking credential to an in-site platform or an off-site platform.

In a specific application, as shown in FIG. 8, the displayed obtained credentials may be displayed as a floating layer on the video playback interface. The terminal displays the obtained credentials in a reverse order of the acquisition times of the viewing marking credentials, and highlights the latest obtained viewing marking credential. In a case of displaying the obtained credentials, the terminal displays the viewing marking credential publishing entry and the viewing marking credential sharing entry below the obtained credentials.

In this embodiment, by displaying the credential interaction entry configured for prompting interaction with at least one of the obtained credentials, interaction with the viewing marking credential can be prompted, so that credential interaction can be implemented in response to the credential interaction trigger event; by displaying the credential interacted prompt, that interaction with the viewing marking credential has succeeded can be prompted; and by interacting with the viewing marking credential, full utilization of the viewing marking credential can be implemented, thereby improving the resource utilization, and avoiding resource waste.

In an embodiment, the video-based interaction method further includes:

displaying a video application interface to which a login object is logged in;

displaying a video application homepage of the first object in response to a homepage viewing trigger event for the first object;

displaying, in a case that a viewing marking record of the first object is in a visible state, a record viewing entry of the viewing marking record on the displayed video application homepage; and displaying the viewing marking record of the first object in response to a record viewing trigger event for the record viewing entry.

The login object refers to an object that logs in to the video application. For example, the login object may specifically refer to the first object. In another example, the login object may specifically refer to an object other than the first object. The homepage viewing trigger event refers to an event of viewing the video application homepage of first object. The record viewing entry is configured for indicating viewing of a viewing marking record. The record viewing trigger event refers to an event for viewing a viewing marking record of the first object.

Specifically, after logging in as the login object, the terminal displays the video application interface to which the login object is logged in, and on the video application interface to which the login object is logged in, the user may choose to view the video application homepage of the first object. The terminal displays the video application homepage of the first object in response to the homepage viewing trigger event for the first object; displays the record viewing entry on the displayed video application homepage in a case that the viewing marking record of the first object is in a visible state; and displays the viewing marking record of the first object in response to a record viewing trigger event for the record viewing entry. That the viewing marking record of the first object is in a visible state means that the viewing marking record of the first object is visible in a guest mode, that is, the first object sets the viewing marking record to be visible for other objects. This may be configured by the first object. In a specific application, the displayed viewing marking record of the first object may be displayed in reverse chronological order, that is, the latest historical viewing marking record is displayed at the top.

In a specific application, as shown in FIG. 9, in a case that the viewing marking record of the first object is in an invisible state, no record viewing entry of the viewing marking record is displayed on the displayed video application homepage. In a case that the viewing marking record of the first object is in the visible state, the record viewing entry of the viewing marking record is displayed on the displayed video application homepage.

In this embodiment, by responding to the homepage viewing trigger event for the first object, the video application homepage of the first object can be displayed, so that in a case that the viewing marking record of the first object is in the visible state, the record viewing entry can be displayed on the displayed video application homepage, and then the viewing marking record of the first object can be displayed in response to the record viewing trigger event for the record viewing entry, to implement viewing on the viewing marking record of the first object, to implement quick search for the followed video based on the viewing marking record of the first object, thereby improving the efficiency of searching for the followed video.

In an embodiment, the record viewing entry includes a viewing calendar, the viewing calendar displaying at least some of viewing marking records in a calendar form.

Specifically, the record viewing entry includes the viewing calendar, the viewing calendar displaying at least some of the viewing marking records in the calendar form. The manner of displaying in the calendar form may be configured according to an actual application scenario. The at least some of the viewing marking records included in the viewing calendar may be at least some of viewing marking records obtained by performing viewing marking with the identity of the first object, or at least some of viewing marking records obtained by performing viewing marking with the identity of an object within a certain range, where the certain range may be configured according to an actual application scenario. For example, the certain range may refer to being within a relationship chain of the first object or belonging to the same organization or region as the first object. The viewing marking records in the viewing calendar may be viewing marking records within a specified time period, where the specified time period may be configured according to an actual application scenario. For example, the specified time period may be this week, this month, the last week, the last month, or the like.

In a specific application, during displaying of some of the viewing marking records in the calendar form, the terminal displays the some of the viewing marking records in the calendar form based on cover color picking logic, that is, determines a filling color of a region in which the record viewing entry is located based on color composition of the displayed viewing marking records, where the cover color picking logic may be configured according to an actual application scenario. In a specific application, if colors of the displayed viewing marking records are colors with a low color purity, the filling color of the region in which the record viewing entry is located may be a color with a high color purity. If colors of the displayed viewing marking records are colors with a high color purity, the filling color of the region in which the record viewing entry is located may be a color with a low color purity. For example, the colors of the displayed viewing marking records may be black, dark blue, red, dark green, and other colors with a low color purity, and the filling color of the region in which the record viewing entry is located may be white, light blue, light pink, and other colors with a high color purity. In a specific application, a record cover of the displayed viewing marking record may be configured according to an actual application scenario. For example, the record cover may be a work cover of a work to which the viewing marking credential corresponding to the viewing marking belongs in the video application.

Figure 10:
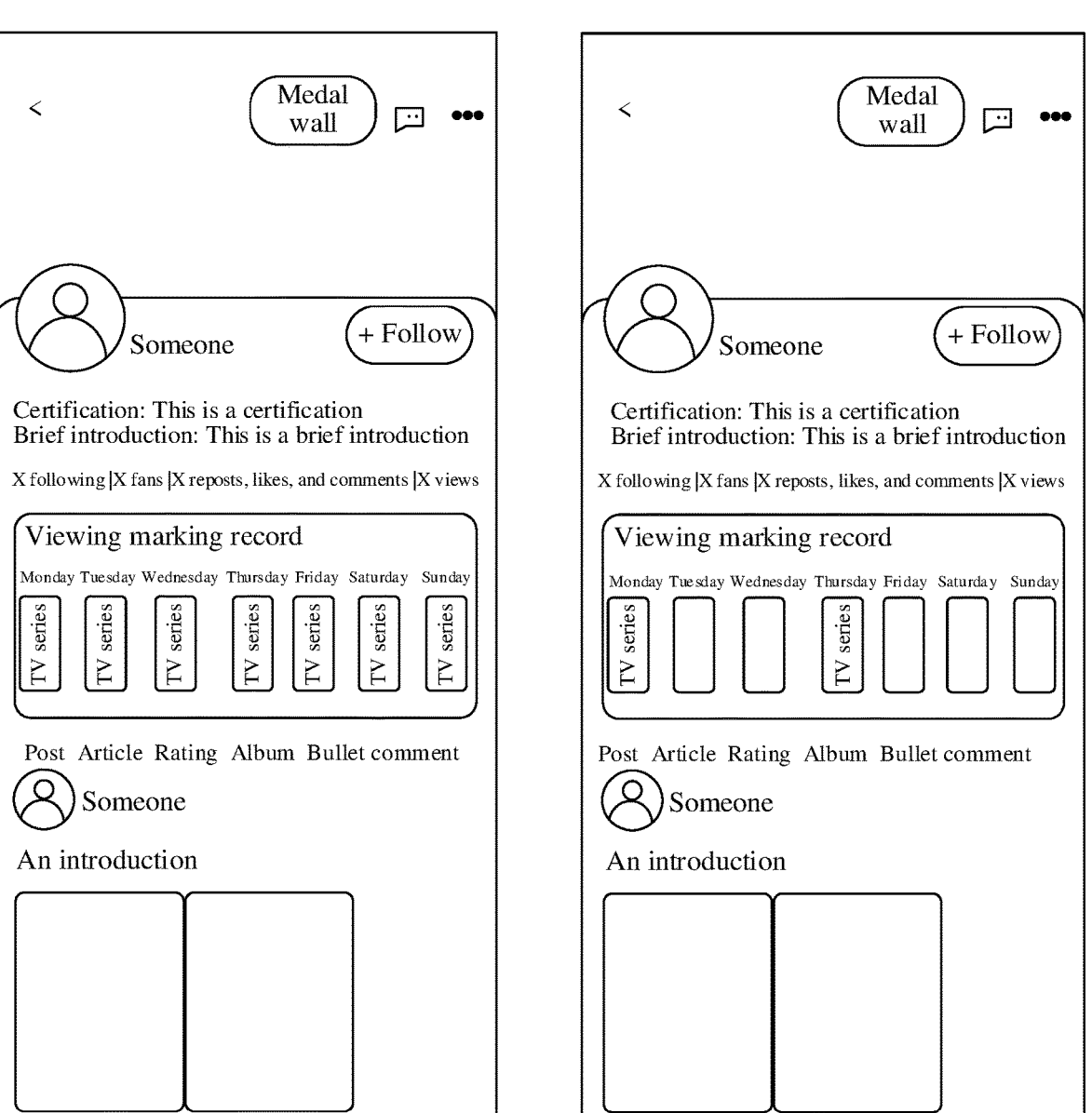
FIG. 10 is a schematic diagram of displaying a viewing marking record within this week in a calendar form according to an embodiment.

In a specific application, the record viewing entry includes a viewing calendar, the viewing calendar displaying at least some of viewing marking records within this week in the calendar form. As shown in 10-1 in FIG. 10, if viewing marking is performed every day within this week, each day on the calendar has a corresponding viewing marking record (which may specifically be a TV series on which viewing marking is performed). As shown in 10-2 in FIG. 10, if viewing marking is only performed on Monday and Thursday, only Monday and Thursday have corresponding viewing marking records (which may specifically be a TV series on which viewing marking is performed) on the calendar.

In this embodiment, the record viewing entry includes a viewing calendar, the viewing calendar displaying at least some of the viewing marking records in the calendar form, so that the latest viewing marking status can be recorded in the calendar form to facilitate user viewing, so that quick search for the followed video is implemented based on the latest viewing marking status, thereby improving the efficiency of searching for the followed video.

In an embodiment, the displaying the viewing marking record of the first object in response to a record viewing trigger event for the record viewing entry includes:

displaying the viewing marking record of the first object in response to the record viewing trigger event for the record viewing entry, the viewing marking record displaying viewing marking credentials by category by using movie and television works as a dimension; and displaying, in response to a credential viewing trigger event for a first movie and television work (also referred to as a "target movie and television work"), a viewing marking credential list of the first movie and television work.

Specifically, the terminal displays the viewing marking record of the first object in response to the record viewing trigger event for the record viewing entry, the viewing marking record displaying viewing marking credentials by category by using movie and television works as a dimension; and In a case of displaying the viewing marking record, the terminal may display, in response to the credential viewing trigger event for the first movie and television work, the viewing marking credential list of the first movie and television work, the viewing marking credential list including viewing marking credentials corresponding to the first movie and television work. In a specific application, when displaying the viewing marking record of the first object, the terminal displays the viewing marking credentials by category by using movie and television works as a dimension in a reverse order of viewing marking.

Figure 11:
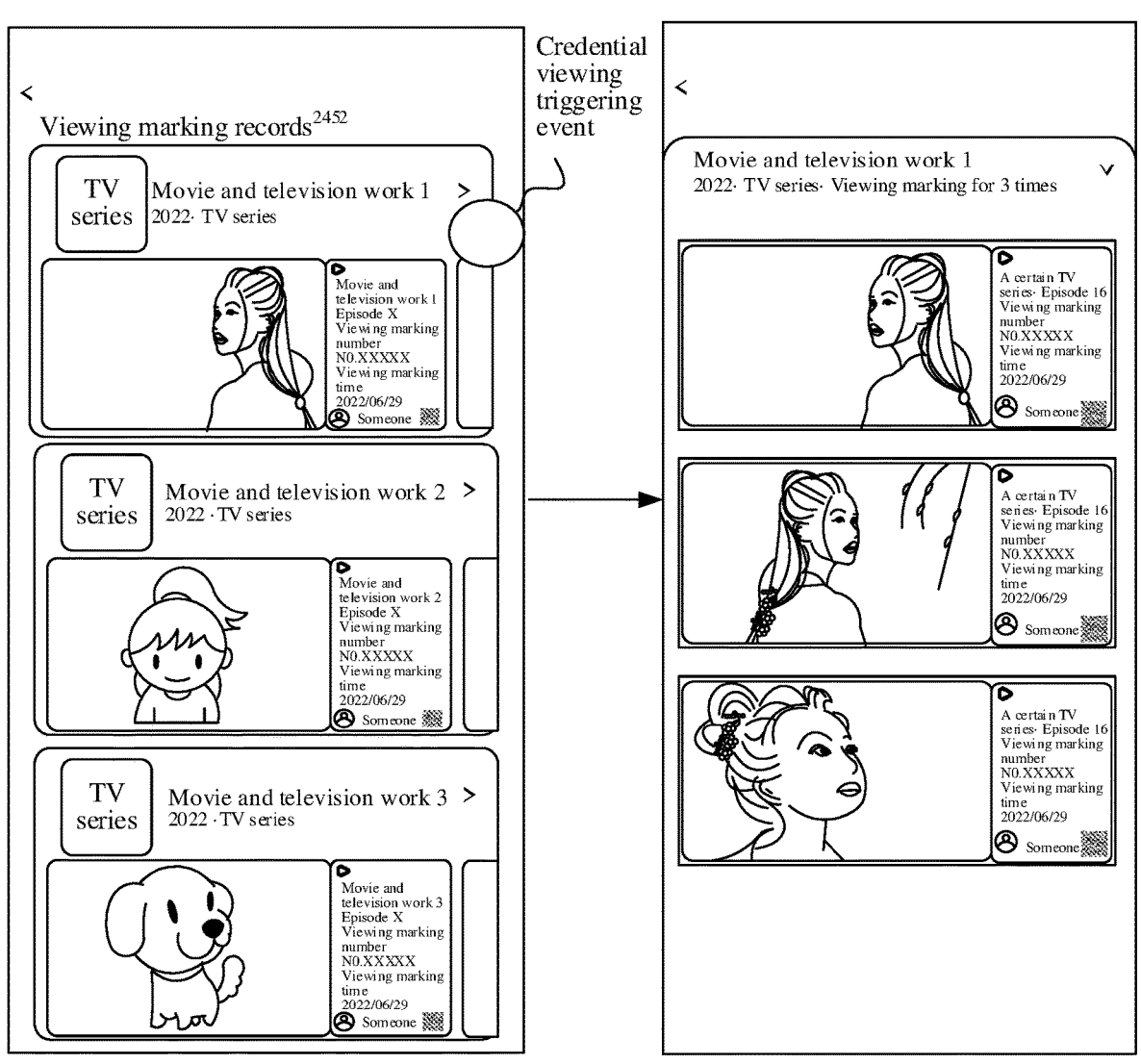
FIG. 11 is a schematic diagram of displaying a viewing marking record according to an embodiment.

In a specific application, as shown in FIG. 11, the viewing marking record displays the viewing marking credentials by category by using movie and television works as a dimension in the reverse order of viewing marking. That is, viewing marking credentials of a movie and television works 1, a movie and television works 2, and a movie and television works 3 are displayed by category by using movie and television works as a dimension in the reverse order of viewing marking, and publishing times (2022 in FIG. 11) of the movie and television work 1, the movie and television work 2, and the movie and television work 3 are also displayed. In a case of responding to a credential viewing trigger event for the movie and television work 1, the terminal further displays a viewing marking credential list of the movie and television work 1, the viewing marking credential list of the movie and television work 1 including viewing marking credentials corresponding to the movie and television work 1.

In this embodiment, by displaying the viewing marking record of the first object by category by using movie and television works as a dimension in response to the record viewing trigger event for the record viewing entry, display of the viewing marking record of the first object by category can be implemented, to implement quick search for the followed video based on the viewing marking record displayed by category, thereby improving the efficiency of searching for the followed video; and by displaying the viewing marking credential list of the first movie and television work in response to the credential viewing trigger event for the first movie and television work, detailed display of the viewing marking record of the first movie and television work can be implemented, to implement quick search for the followed video based on the viewing marking record displayed in detail, thereby improving the efficiency of searching for the followed video.

In an embodiment, the video-based interaction method further includes:

displaying a viewing marking icon on the video playback interface, and displaying a marking success prompt pointing to the viewing marking icon, the viewing marking credential occupying a part of the marking success prompt. The viewing marking icon may be configured for instructing the user to actively trigger viewing marking, that is, the viewing marking icon may be a viewing marking entry when the user actively triggers viewing marking. The marking success prompt is configured for prompting a viewing marking success.

Specifically, the terminal displays a viewing marking icon on the video playback interface, and displays a marking success prompt pointing to the viewing marking icon, the viewing marking credential occupying a part of the marking success prompt. In a specific application, after displaying the marking success prompt pointing to the viewing marking icon, the terminal displays the viewing marking icon with a swinging animation effect. In a specific application, a swinging manner of the viewing marking icon may be swinging left and right. In a specific application, the swinging manner of the viewing marking icon may be swinging up and down.

Figure 12:
FIG. 12 is a schematic diagram of displaying a viewing marking icon and a marking success prompt according to an embodiment.

In a specific application, as shown in FIG. 12, the terminal displays the viewing marking icon on the video playback interface, and displays the marking success prompt pointing to the viewing marking icon, the viewing marking credential occupying a part of the marking success prompt. After displaying the marking success prompt pointing to the viewing marking icon, the terminal displays the viewing marking icon with a swinging animation effect, where the swinging manner is swinging left and right.

In this embodiment, by displaying the viewing marking icon on the video playback interface and displaying the marking success prompt pointing to the viewing marking icon, the display form of the viewing marking success is enriched, and the prompt of the viewing marking success can be displayed intuitively, so that the user intuitively perceives the viewing marking success.

In an embodiment, the description information of the video includes a video representation image, the video representation image being a dynamic image, and including an image foreground part and an image background part; and the displaying the viewing marking credential includes:

displaying, in response to a dynamic display trigger event and along with a motion direction corresponding to the dynamic display trigger event, a video representation image in which the image foreground part is moved and the image background part remains unchanged, a movement direction of the image foreground part being the same as the motion direction.

Specifically, the description information of the video includes the video representation image, the video representation image being an image configured for representing the video. In a specific application, for different viewing marking, video representation images thereof are different. For episode-based viewing marking, the video representation image thereof may be a pre-configured video frame selected from a film and television episode being watched. For viewing marking on the first scene clip, the video representation image thereof may also be pre-configured. For viewing marking on the current playback picture, the video representation image thereof may be the current playback picture. In a specific application, for viewing marking on the first scene clip, the video representation image thereof may be a video frame selected from the first scene clip.

The dynamic image refers to a dynamic and changeable image. For example, the dynamic image may specifically be a dynamical image generated through a three-dimensional (3D) effect. The image foreground part refers to a part of the image that needs to be focused on and includes people, a landscape, sceneries, and the like. The image background part refers to a part of the image other than the image foreground part that does not need to be focused on. The dynamic display trigger event refers to an event that triggers dynamic display. For example, the dynamic display trigger event may specifically be moving the terminal. For example, the dynamic display trigger event may specifically be shaking the terminal.

Specifically, when a dynamic display trigger event is detected, the terminal determines a motion direction corresponding to the dynamic display trigger event in response to the dynamic display trigger event, and displays, along with the motion direction corresponding to the dynamic display trigger event, a video representation image in which the image foreground part is moved and the image background part remains unchanged, a movement direction of the image foreground part being the same as the motion direction.

In a specific application, the dynamic display trigger event may specifically be moving the terminal. In a process of moving the terminal, changes in the up, down, left, and right inclination angles of the terminal can be detected, so that the motion direction of the terminal can be determined, and then a video representation image in which the image foreground part is moved and the image background part remains unchanged can be displayed along with the motion direction, the movement direction of the image foreground part being the same as the motion direction. In a specific application, the motion direction is left, and the terminal displays the video representation image in which the image foreground part is moved to the left and the image background part remains unchanged.

In a specific application, the terminal has a built-in acceleration sensor. The acceleration sensor is a sensor that can measure an acceleration. In the acceleration process, the acceleration sensor uses Newton's second law to obtain an acceleration value by measuring the inertial force exerted on a mass block.

In a specific application, the dynamic image is obtained by dynamizing a static image, where the dynamizing manner may be image inpainting; or the dynamic image may be obtained in an image three-dimensional manner. In a specific application, a camera's view frustum may be predicted based on neural radiance field (NeRF), to infer a relative position and an angle change in the three-dimensional space, thereby conveniently and efficiently rendering an RGB (red, green, and blue) image and a depth map under a new camera view, thereby achieving the image three-dimensional purpose. In a specific application, an autoregressive three-dimensional inference model may alternatively be used to perform image three-dimensional. In a specific application, features may be extracted from the image first, then may be transformed into a characteristic point cloud based on camera parameters, then the characteristic point cloud is rendered to a two-dimensional pixel position according to a relative transformation matrix, and finally a final new perspective image is generated through a generative adversarial network, thereby achieving a 3D effect.

In a specific application, the static image may be configured according to an actual application scenario. For example, for different viewing marking, static images thereof are different. For episode-based viewing marking, the static image thereof may be a pre-configured video frame selected from a film and television episode being watched. For viewing marking on the first scene clip, the static image thereof may be a pre-configured video frame selected from the first scene clip. For viewing marking on the current playback picture, the static image thereof may be the current playback picture.

In this embodiment, by displaying, in response to a dynamic display trigger event and along with a motion direction corresponding to the dynamic display trigger event, a video representation image in which the image foreground part is moved and the image background part remains unchanged, a movement direction of the image foreground part being the same as the motion direction, dynamic display of the video representation image can be implemented with reference to the motion direction corresponding to the dynamic display trigger event. Compared with a conventional static image, this solid-state image provides a new interactive gameplay, which can improve the viewing atmosphere and user retention, make full use of the video representation image, and improve the resource utilization.

In an embodiment, the displaying, along with a motion direction corresponding to the dynamic display trigger event, a video representation image in which the image foreground part is moved and the image background part remains unchanged includes:

moving the image foreground part based on the motion direction corresponding to the dynamic display trigger event;

acquiring an image inpainting result corresponding to the video representation image, and inpainting a hole between the moved image foreground part and the image background part based on the image inpainting result corresponding to the video representation image, to obtain the video representation image in which the image foreground part is moved and the image background part remains unchanged; and displaying the video representation image in which the image foreground part is moved and the image background part remains unchanged.

The image inpainting result refers to a result obtained by performing image inpainting on a static image corresponding to the video representation image. For example, the image inpainting result may be specifically generated by performing 3D image inpainting on the static image corresponding to the video representation image.

Specifically, the terminal may determine, based on the motion direction corresponding to the dynamic display trigger event, a direction and a magnitude based on which the image foreground part needs to be moved, so that the image foreground part can be moved based on the direction and the magnitude. The image inpainting result corresponding to the video representation image includes inpainting information of the hole between the image foreground part and the image background part in the video representation image. The terminal acquires an image inpainting result corresponding to the video representation image, then can inpaint a hole between the moved image foreground part and the image background part based on the image inpainting result corresponding to the video representation image, to obtain the video representation image in which the image foreground part is moved and the image background part remains unchanged, and display the video representation image in which the image foreground part is moved and the image background part remains unchanged, to make the image foreground part protrusive and the image background part flat, thereby presenting a three-dimensional effect.

In this embodiment, the image foreground part can be accurately moved based on the motion direction corresponding to the dynamic display trigger event, so that based on that an image inpainting result corresponding to the video representation image is acquired, a hole between the moved image foreground part and the image background part can be inpainted based on the image inpainting result corresponding to the video representation image, to obtain and display the video representation image in which the image foreground part is moved and the image background part remains unchanged, thereby implementing dynamic display with reference to the motion direction, making full use of the video representation image, and improving the resource utilization.

In an embodiment, the image inpainting result corresponding to the video representation image is generated in the following manner:

extracting a first video frame (also referred to as a "target video frame") corresponding to the video representation image from the video; and performing depth estimation and image inpainting on the first video frame, to obtain the image inpainting result corresponding to the video representation image.

The first video frame is a static image corresponding to the video representation image, which may be configured according to an actual application scenario. For example, for episode-based viewing marking, the first video frame thereof may be any pre-configured video frame in the video. In another example, for viewing marking on the first scene clip, the first video frame thereof may be any video frame selected from the first scene clip. In another example, for viewing marking on the current playback picture, the first video frame thereof may be the current playback picture. Depth estimation refers to estimating a distance of each pixel in an image relative to a shooting source.

Specifically, after the first video frame corresponding to the video representation image is extracted from the video, depth information of each pixel in the first video frame, that is, a depth estimation image, may be obtained by performing depth estimation on the first video frame, and then image inpainting may be performed on the depth estimation image to obtain an image inpainting result corresponding to the video representation image. The image inpainting result corresponding to the video representation image in this embodiment may be directly generated by the terminal, or may be generated by the server and then delivered to the terminal.

In this embodiment, a depth estimation algorithm is not specifically limited, provided that the depth estimation can be implemented. In a specific application, the used depth estimation algorithm may be MiDaS proposed by Ranftl et al. In MiDaS, a plurality of depth data sets are used for training, and 3D movie data is added for training, which makes the model have strong generalization capability and be more suitable for the scenarios in this embodiment. In a specific application, the first video frame is usually an RGB image, and then after depth estimation is performed, the obtained depth estimation image is an RGB-depth (RGB-D) image.

In this embodiment, by extracting the first video frame corresponding to the video representation image from the video, and performing depth estimation on the first video frame, a depth estimation image can be obtained, so that an image inpainting result corresponding to the video representation image can be obtained by performing image inpainting on the depth estimation image.

In an embodiment, the performing depth estimation and image inpainting on the first video frame, to obtain the image inpainting result corresponding to the video representation image includes:

performing depth estimation on the first video frame, to obtain a depth estimation image;

performing image format conversion on the depth estimation image, to obtain a converted image in a hierarchical depth image format;

determining at least one edge region with a discontinuous depth in the converted image based on depth information at each pixel position in the converted image; and inpainting a pixel at each pixel position in the edge region based on a local region corresponding to the edge region, to obtain the image inpainting result corresponding to the video representation image.

In the converted image in the hierarchical depth image format, each pixel stores color information, depth information, and local connectivity of the pixel, that is, each pixel's directly adjacent pixel pointers in the four directions of up, down, left, and right (which may be none).

Specifically, by performing depth estimation on the first video frame, a depth estimation image can be obtained, and by performing image format conversion on the depth estimation image, a converted image in the hierarchical depth image format can be obtained, so that pixel points with discontinuous depth values in the converted image can be determined based on depth information at each pixel position in the converted image, and then at least one edge region with a discontinuous depth in the converted image can be determined based on the pixel points with discontinuous depth values in the converted image, the edge region having a high probability of being a boundary between the foreground and the background in the image. After the at least one edge region with a discontinuous depth in the converted image is determined, pixels in the edge region with a discontinuous depth will be disconnected, then based on a local region corresponding to the edge region, a pixel at each pixel position in the edge region is inpainted in a learning manner, and color information and depth information of the pixels are completed, until all edge regions with discontinuous depths in the image are inpainted. The inpainted color information and depth information are updated to the image hierarchical depth image (LDI), to obtain an image inpainting result corresponding to the video representation image, where the image inpainting result is LDI format data. A range of the local region corresponding to the edge region may be configured according to an actual application scenario.

In this embodiment, by performing depth estimation on the first video frame, a depth estimation image can be obtained, and by performing image format conversion on the depth estimation image, a converted image in the hierarchical depth image format can be obtained, so that at least one edge region with a discontinuous depth in the converted image can be determined based on depth information at each pixel position in the converted image, and then a pixel at each pixel position in the edge region can be inpainted based on a local region corresponding to the edge region, thereby implementing image inpainting, and obtaining the image inpainting result corresponding to the video representation image.

In an embodiment, the process of the performing depth estimation and image inpainting on the first video frame, to obtain the image inpainting result corresponding to the video representation image is performed through a pre-trained image inpainting model; and the pre-trained image inpainting model is obtained through training operations, the training operations including:

acquiring at least one training video and an initial image inpainting model;

acquiring, for each video frame in the at least one training video, optical flow information between the targeted video frame and a next temporally adjacent video frame, performing depth estimation and image inpainting on the targeted video frame through the initial image inpainting model, to obtain a preliminary inpainting result corresponding to the targeted video frame, and obtaining a loss function value corresponding to the targeted video frame based on the optical flow information and the preliminary inpainting result; and performing parameter adjustment on the initial image inpainting model based on the loss function value corresponding to each video frame in the at least one training video, to obtain the pre-trained image inpainting model.

The training video may be configured according to an actual application scenario. The optical flow is a pattern of motion of objects, surfaces, and edges in a visual scene caused by relative motion between an observer and a scene. Generally, the optical flow is generated by movement of the foreground, movement of the observer, or combined movement of the foreground and the observer in the scene. In this embodiment, the optical flow is mainly generated by the movement of the foreground in the scene. The optical flow may be used to summarize information of previous and following frames of the video. Because adjacent frames in the video usually have high similarity, subjects (for example, people) in adjacent frames usually remain unchanged, but shooting angles or subject postures are slightly changed, that is, having geometric consistency. The background covered in the previous frame may be displayed in the next frame. Therefore, the information of the previous and following frames of the video can be used to improve the effect of image inpainting on the image. In this embodiment, that is, the optical flow is used to improve the effect of image inpainting on the image.

Specifically, the process of the performing depth estimation and image inpainting on the first video frame, to obtain the image inpainting result corresponding to the video representation image may be performed through a pre-trained image inpainting model. That is, the first video frame is inputted into the pre-trained image inpainting model, and then the pre-trained image inpainting model outputs an image inpainting result corresponding to the video representation image. The training steps of the pre-trained image inpainting model include: first acquiring at least one training video and an initial image inpainting model; acquiring, for each video frame in the at least one training video, optical flow information between the targeted video frame and a next temporally adjacent video frame, performing depth estimation and image inpainting on the targeted video frame through the initial image inpainting model, to obtain a preliminary inpainting result corresponding to the targeted video frame, and obtaining a loss function value corresponding to the targeted video frame based on the optical flow information and the preliminary inpainting result; and performing parameter adjustment on the initial image inpainting model based on the loss function value corresponding to each video frame in the at least one training video, to obtain the pre-trained image inpainting model.

Figure 13:
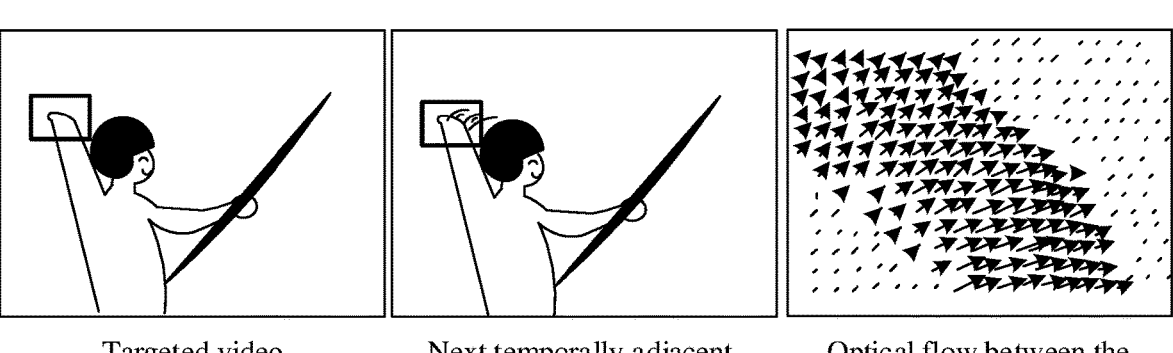
FIG. 13 is a schematic diagram of a targeted video frame and an optical flow according to an embodiment.

In a specific application, people and the like in the training video move over time. For example, a person on the left side in the targeted video frame may move to the right side in a next temporally adjacent video frame. In an optical flow algorithm, gradients of the targeted video frame in a horizontal direction, a vertical direction, and a temporal direction are calculated, to infer a direction and a speed of pixel movement in the targeted video frame. In a specific application, as shown in FIG. 13, the targeted video frame, the next temporally adjacent video frame, and the optical flow between the two video frames in the training video are given. In FIG. 13, a direction indicated by the arrow represents the direction of the pixel movement, and the length of the arrow represents the speed of the pixel movement. In this embodiment, the optical flow algorithm used for acquiring the optical flow information is not limited, provided that optical flow calculation can be achieved. In a specific application, the used optical flow algorithm may be total variation regularization (TV-L1).

In a specific application, after the targeted video frame is inputted into the initial image inpainting model, the initial image inpainting model first performs depth estimation on the targeted video frame, to obtain a depth estimation image corresponding to the targeted video frame, then performs image format conversion on the depth estimation image, to obtain a converted image in the hierarchical depth image format, then finds an edge with a discontinuous depth based on depth information at each pixel position in the converted image, and then completes color and depth information of the edge based on a local region corresponding to the edge, to obtain a preliminary inpainting result corresponding to the targeted video frame. After the preliminary inpainting result corresponding to the targeted video frame is obtained, image format conversion may be performed based on the preliminary inpainting result, to obtain a preliminary inpainted image corresponding to the targeted video frame, and then a loss function value corresponding to the targeted video frame is obtained based on the optical flow information, the targeted video frame, and the preliminary inpainted image corresponding to the targeted video frame.

Figure 14:
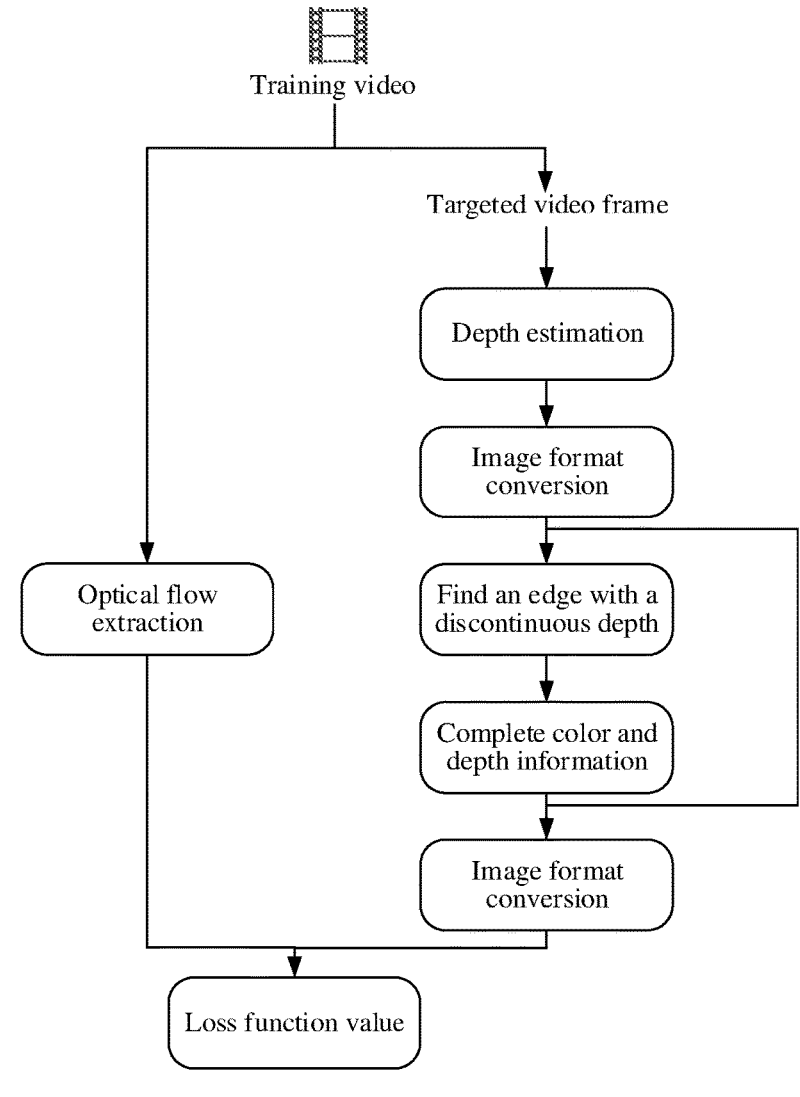
FIG. 14 is a schematic diagram of training an initial image inpainting model according to an embodiment.

In a specific application, as shown in FIG. 14, the initial image inpainting model first performs depth estimation on the targeted video frame, to obtain a depth estimation image (RGB-D image) corresponding to the targeted video frame, then performs image format conversion (RGB→LDI) on the depth estimation image, to obtain a converted image in the hierarchical depth image format, then finds an edge with a discontinuous depth based on depth information at each pixel position in the converted image, and then completes color and depth information of edge based on a local region corresponding to the edge, to obtain a preliminary inpainting result (data in the LDI format) corresponding to the targeted video frame. By performing image format conversion (LDI→RGB) based on the preliminary inpainting result, a preliminary inpainted image corresponding to the targeted video frame can be obtained, and with reference to the optical flow information obtained by optical flow extraction, the targeted video frame, and the preliminary inpainted image, a loss function value corresponding to the targeted video frame can be obtained. In this embodiment, at the training stage, by using information of an adjacent frame of the video, that is, the optical flow information, for model training, a pre-trained image inpainting model with good image inpainting effect can be obtained, so that the image inpainting model can be used to improve the image inpainting effect.

In an embodiment, the obtaining a loss function value corresponding to the targeted video frame based on the optical flow information and the preliminary inpainting result includes:

comparing the targeted video frame with a preliminary inpainted image corresponding to the preliminary inpainting result, to obtain a first loss function value;

determining at least one edge pixel position at an image depth edge and a plurality of adjacent pixel positions corresponding to the at least one edge pixel position respectively in the targeted video frame based on the preliminary inpainting result;

respectively calculating, for each first edge pixel position (also referred to as "target edge pixel position") in the at least one edge pixel position, displacement vectors between the first edge pixel position and a plurality of first adjacent pixel positions (also referred to as "target adjacent pixel positions") corresponding to the first edge pixel position, acquiring an optical flow vector of the first edge pixel position from the optical flow information, and obtaining a consistency loss function value corresponding to the first edge pixel position based on the displacement vectors and the optical flow vector;

obtaining a second loss function value based on the consistency loss function value corresponding to each edge pixel position; and weighting the first loss function value and the second loss function value, to obtain the loss function value corresponding to the targeted video frame. For example, the loss function value can be obtained by summing weighted first loss function value and weighted second loss function value.

The first adjacent pixel position refers to an adjacent pixel position of the first edge pixel position.

Specifically, image format conversion is performed based on the preliminary inpainting result, and a preliminary inpainted image corresponding to the targeted video frame can be obtained, so that a first loss function value can be obtained by comparing pixel values at same pixel positions in the targeted video frame and the preliminary inpainted image corresponding to the preliminary inpainting result. In addition, at least one edge pixel position at an image edge and a plurality of adjacent pixel positions corresponding to the at least one edge pixel position respectively in the targeted video frame can be determined based on the preliminary inpainting result. For each first edge pixel position in the at least one edge pixel position, displacement vectors between the first edge pixel position and a plurality of first adjacent pixel positions corresponding to the first edge pixel position are respectively calculated, and a direction of adjacent pixel can be obtained, so that based on acquisition of an optical flow vector of the first edge pixel position from the optical flow information, a consistency loss function value corresponding to the first edge pixel position can be obtained based on the displacement vectors and the optical flow vector. In other words, it is expected that the motion direction calculated based on the optical flow information (that is, the optical flow vector) and the direction of the first adjacent pixel (displacement vector) obtained through image inpainting have certain consistency. By adding the consistency loss function values corresponding to the edge pixel positions, a second loss function value can be obtained, and by weighting the first loss function value and the second loss function value, a loss function value corresponding to the targeted video frame can be obtained.

Figure 15:
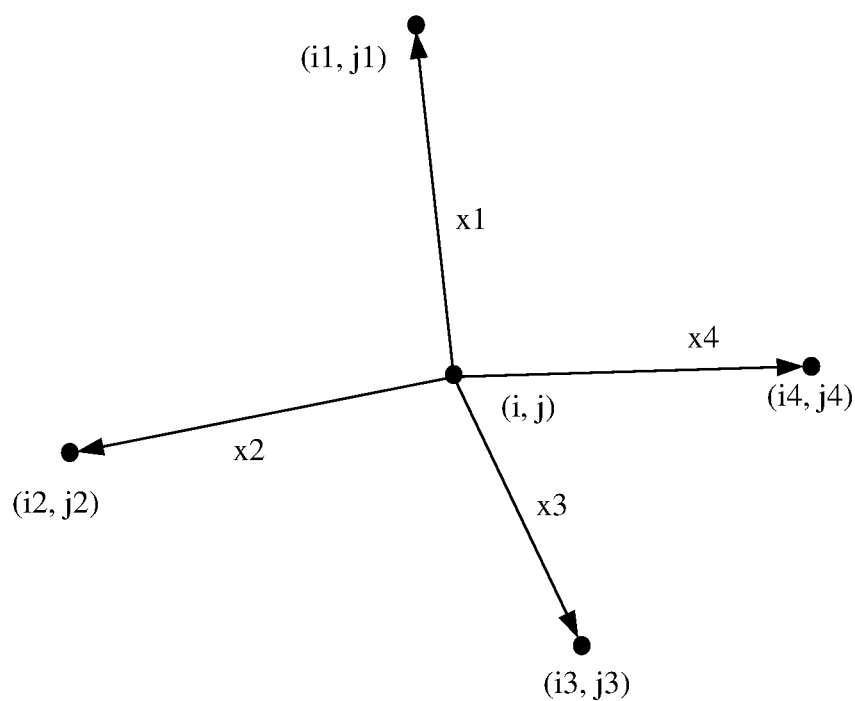
FIG. 15 is a schematic diagram of a displacement vector according to an embodiment.

In a specific application, the displacement vector is configured for representing the direction of the first adjacent pixel, and is a vector pointing from the first edge pixel position to the first adjacent pixel position. In a specific application, as shown in FIG. 15, for a first edge pixel position (i, j), directly adjacent pixels (i1, j1) (i2, j2), (i3, j3), and (i4, j4) of the first edge pixel position in the four directions of up, down, left, and right can be obtained, and then four displacement vectors may be calculated respectively, where the kth displacement vector is $x_k = (ik-i, jk-j)$.

In a specific application, the consistency loss function is configured for representing a degree of consistency between the motion direction calculated based on the optical flow information (that is, the optical flow vector) and the direction of the first adjacent pixel (displacement vector) obtained through image inpainting. A smaller consistency loss function value indicates a higher degree of consistency. In a specific application, the consistency loss function may specifically be: $L = \min_{1 \leq k \leq 4} \|f - x_k\|^2$, where f represents an optical flow vector of the first edge pixel position (i, j), $x_k$ represents the $k^{th}$ displacement vector, $\| \|$ is a norm symbol, and min represents a minimum value.

In this embodiment, at the training stage, by adding the consistency loss to the loss function of image inpainting, the information of adjacent frames of the video can be used to improve the geometric consistency of image inpainting, thereby improving the effect of image inpainting.

In an embodiment, the displaying a viewing marking credential for the first scene clip in response to a viewing marking trigger operation on the first scene clip marking entry includes:

updating the local viewing marking record based on the first scene clip in response to the viewing marking trigger operation on the first scene clip marking entry, and transmitting a credential information acquisition request;

receiving first credential information (also referred to as "target credential information") corresponding to the credential information acquisition request; and displaying the viewing marking credential for the first scene clip based on the first credential information.

The first credential information includes the description information of the video, the identity information of the first object, the viewing marking time, the viewing marking number, and the like.

Specifically, if a viewing marking trigger operation on the first scene clip marking entry is detected, the terminal updates the local viewing marking record based on the first scene clip in response to the viewing marking trigger operation on the first scene clip marking entry, and transmits a credential information acquisition request to the server, so that the server returns corresponding first credential information based on the credential information acquisition request, to display the viewing marking credential for the first scene clip based on the first credential information.

In a specific application, when displaying the viewing marking credential for the first scene clip based on the first credential information, the terminal locally generates a jump routing uniform resource locator (URL) according to the first scene clip, then uses quick response code (qrcode) .software development kit (sdk) to generate a two-dimensional code image corresponding to the jump routing URL, and displays the viewing marking credential for the first scene clip including the first credential information and the two-dimensional code image. By scanning the two-dimensional code image, the first scene clip targeted by the viewing marking can be jumped to.

Figure 16:
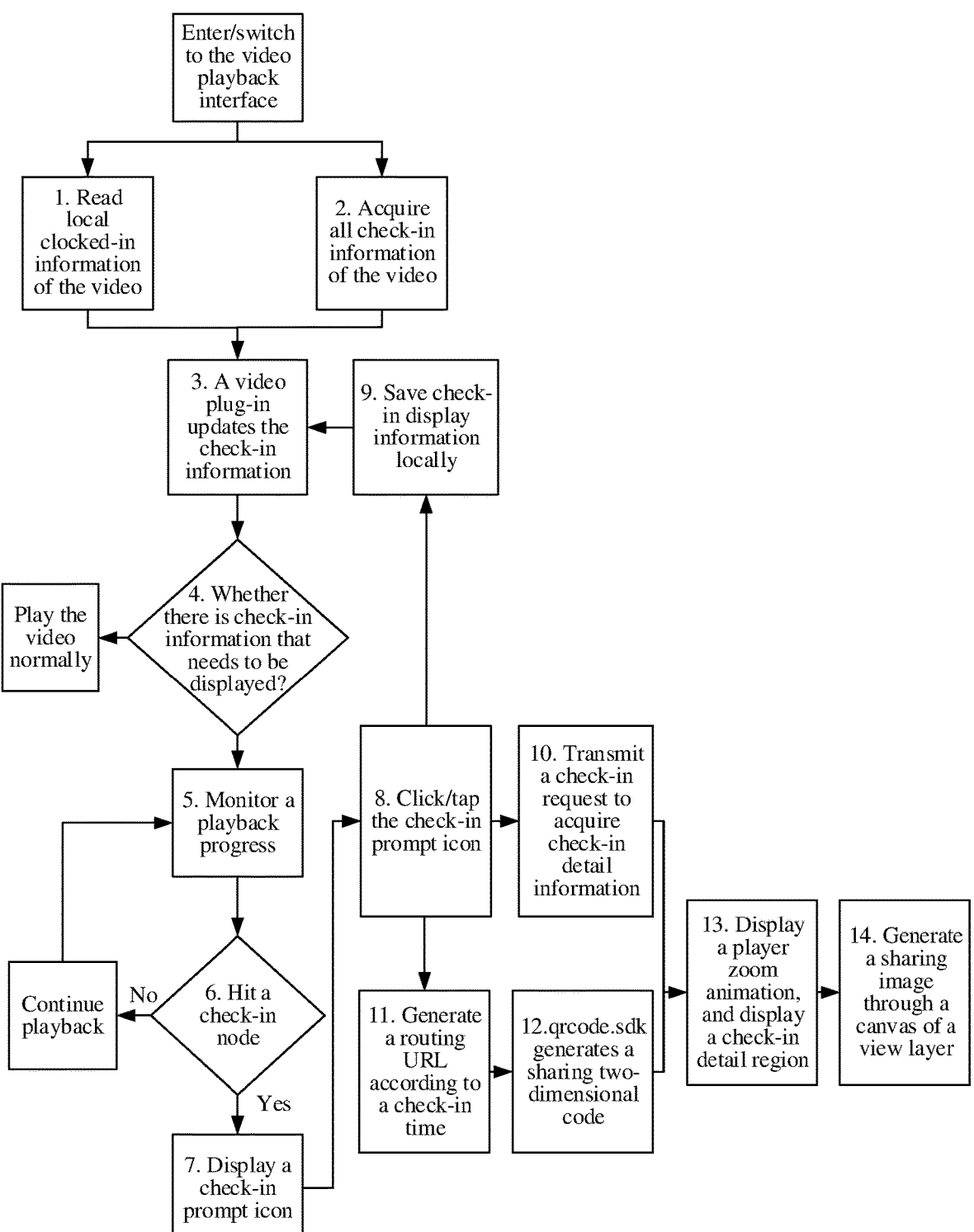
FIG. 16 is a schematic diagram of checking in a first scene clip according to an embodiment.

In a specific application, the viewing marking may be understood as checking in the video. As shown in FIG. 16, after entering the video playback interface or switching to the video playback interface, checking in the video specifically includes the following steps: 1. The terminal reads checked-in information of the video to be played locally (a local viewing marking record). 2. Request all check-in information (that is, scene information of the markable scene clips) of the video from the server. 3. Update the check-in information through a video plug-in. 4. Determine whether there is check-in information that needs to be displayed. If all the markable scene clips in the video have been checked-in, it means that there is no check-in information that needs to be displayed, and the terminal will play the video normally. 5. If there is an unchecked first scene clip in the video, the terminal will monitor a playback progress of the video based on the first scene clip. 6. Determine whether a check-in node is hit, and continue to play the video normally when no check-in node is hit (that is, the first scene clip is not played). 7. Display a check-in prompt icon (that is, the first scene clip marking entry) when the check-in node is hit (that is, when the first scene clip is played). 8. Determine whether the user clicks/taps on the check-in prompt icon. 9. If the user clicks/taps on the check-in prompt icon, save check-in display information locally, so that the video plug-in can update the check-in information. 10. If the user clicks/taps on the check-in prompt icon, the terminal transmits a check-in request (credential information acquisition request) to acquire detail information (first credential information). 11. Generate a routing URL according to a check-in time. 12. Use qrcode.sdk to generate a two-dimensional code image corresponding to the jump routing URL, that is, sharing two-dimensional code. 13. After the first credential information and the two-dimensional code image are acquired, display a player zoom animation, and display the check-in detail information (that is, the viewing marking credential, including the first credential information and the two-dimensional code image) on the right side of the video. 14. The terminal generates an icon of a sharing image through a canvas of a view layer, to share the viewing marking credential.

In this embodiment, by updating the local viewing marking record in response to the viewing marking trigger operation on the first scene clip marking entry, the accuracy of the local viewing marking record can be ensured, and by transmitting the credential information acquisition request, the corresponding first credential information can be received, then the viewing marking credential for the first scene clip can be accurately displayed based on the first credential information, to implement accurate recording of the video followed by the first object, thereby helping the first object to quickly search for the followed video based on the viewing marking credential, and improving the efficiency of searching for the followed video.

Figures 17, 18:
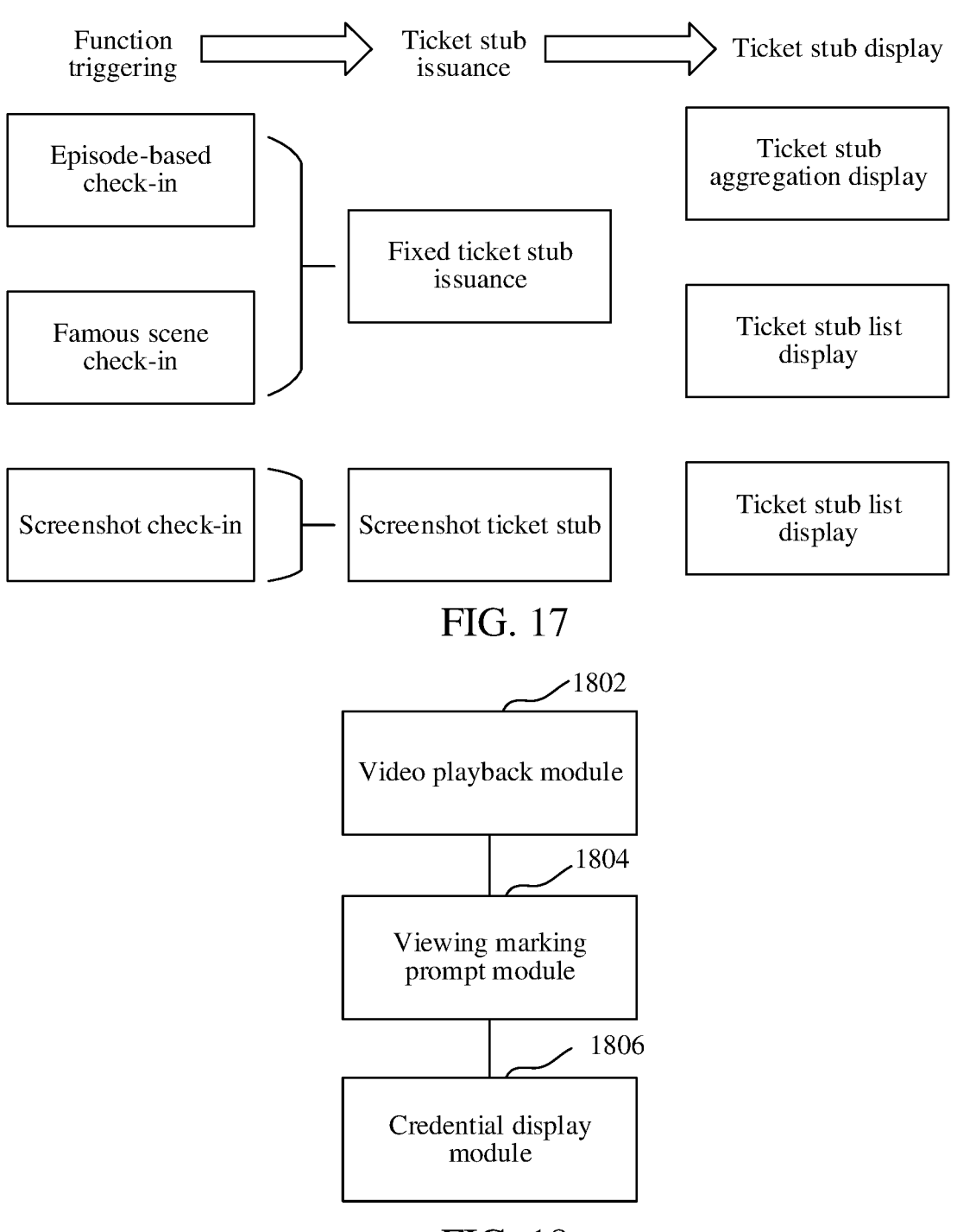
FIG. 17 is a schematic diagram of application of a video-based interaction method according to an embodiment.
FIG. 18 is a structural block diagram of a video-based interaction apparatus according to an embodiment.

In an embodiment, the video-based interaction method of this application is described by using an example in which viewing marking is check-in and a viewing marking credential is a ticket stub. As shown in FIG. 17, the video-based interaction method involved in this application mainly includes three parts: check-in triggering, ticket stub issuance, and ticket stub display.

For check-in triggering, there are mainly three triggering manners, including episode-based check-in (performing viewing marking on an episode within which the video falls), famous scene check-in (performing viewing marking on the first scene clip), and screenshot check-in (performing viewing marking on the current playback picture).

For the famous scene check-in, a limited quantity of special ticket stubs will be configured in a classic scene. Users may click/tap on a check-in entry to receive the configured famous scene commemorative ticket stubs. The famous scene commemorative ticket stubs may alternatively be dynamical images generated through a 3D effect (that is, the issued ticket stubs are fixed ticket stubs, and may be configured according to an actual application scenario). Further, in order to ensure the scarcity of famous scene commemorative ticket stubs issued for famous scene check-in, the ticket stubs will be issued within a limited time period or in a limited quantity. The limited time period and limited quantity may be configured according to an actual application scenario. For the screenshot check-in, the user may actively trigger the check-in function by clicking/tapping on the check-in entry. After the clicking/tapping, a ticket stub will be generated based on the current playback picture. For the episode-based check-in, the user may choose to check-in this episode according to a prompt at the title or the tail leader. The issued ticket stub is a fixed ticket stub, and may be configured according to an actual application scenario. Further, each person is limited to one check-in per day, and a plurality of check-in records will be displayed on the same ticket stub as a cumulative quantity of times (that is, the ticket stub aggregation display in FIG. 17).

After the check-in is triggered, the terminal is pre-configured with a triggering effect. After the user perform clicking/tapping for check-in, a check-in fixed button displays a swing animation effect, and a ticket stub animation effect appears to make the ticket stub point to the check-in fixed button. If the user clicks/taps on a ticket stub image in this process, an in-frame ticket stub display page is entered. Obtained ticket stubs for the movie and television work corresponding to the video are displayed on ticket stub display page, and sliding to view a ticket stub that the user has obtained for the movie and television work is supported. In addition, the ticket stub display page includes a publishing entry and a sharing entry. By clicking/tapping on the publish entry, an in-frame publisher can be called, to guide the user to publish the obtained ticket stub as a post on an in-site platform; and by clicking/tapping on the share entry, an in-frame sharing floating layer is pulled up, which supports sharing of the ticket stub to an off-site platform or the in-site platform.

For ticket stub issuance, basic elements displayed in the ticket stub may include a name of a movie and television work, a current episode, a check-in time point (year, month, day, hour, minute, and second), a unique ticket stub number, a two-dimensional code that can be linked to the video, an avatar and a nickname of the first object that performs check-in, a video application logo, and a video representation image. Further, for famous scene check in, the basic elements further include a scene name. In addition to display of the basic elements, the backgrounds of ticket stubs and ticket stub images are customized according to different movie and television works.

For ticket stub display, as shown in FIG. 17, for episode-based check-in, ticket stubs will be displayed in an aggregated manner, that is, a plurality of check-in records will be displayed on the same ticket stub as a cumulative quantity of times. Ticket stubs for famous scene check-in and screenshot check-in will be displayed in ticket stub list form, that is, each check-in corresponds to one ticket stub. A switch will be set in the video application to allow the user to choose whether the check-in content is visible in the guest mode. If it is visible in the guest mode, other users may view the check-in record by viewing the user's personal page, and the check-in record is displayed on the personal page by using the cover color picking logic in the calendar form. Further, if other users choose to view the user's check-in record, the ticket stubs obtained by the user will be displayed on the personal page by using movie and television works as a dimension.

It is considered by the inventor that the video-based interaction method involved in this application can enhance the sense of skeuomorphism, and issuing a ticket stub after check-in of the user can enhance the user's viewing recalling emotion. It is also considered by the inventor that the current video application has an excessively strong sense of tool, and user access to the video application is strongly related to copyright, so that the stickiness to the video application is relatively poor. Through the video-based interaction method involved in this application, the user's image can be enriched in the form of quantitative display of viewing behaviors, to improve the user stickiness and gradually establish a non-copyright access mechanism. Further, in order to improve the interest of check-in and movie-viewing data, in consideration of user viewing scenarios, for example, the user will collect a movie ticket when going to a cinema to watch a movie, a form of issuing a commemorative ticket stub is used. By providing ticket stub issuance after check-in for the user in the viewing process, memories can be left for the user's viewing, the sense of skeuomorphism is strong, and the interaction threshold is lowered, thereby allowing content accumulation on a personal page of the viewing user and strengthening the user's image.

Although the steps in the flowcharts involved in the foregoing embodiments are displayed sequentially according to instructions of arrows, these steps are not necessarily performed sequentially according to a sequence instructed by the arrows. Unless explicitly specified in this specification, execution of the steps is not strictly limited in the sequence, and the steps may be performed in other sequences. In addition, at least some steps in the flowcharts involved in the foregoing embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Based on the same inventive concept, an embodiment of this application further provides a video-based interaction apparatus configured to implement the foregoing video-based interaction method. The implementation solution provided by this apparatus to resolve the problem is similar to the implementation solution recorded in the foregoing method. Therefore, for specific limitations in the one or more embodiments of the video-based interaction apparatus provided below, reference may be made to the limitations on the video-based interaction method above, and details are not described herein again.

In an embodiment, as shown in FIG. 18, a video-based interaction apparatus is provided, including: a video playback module 1802, a viewing marking prompt module 1804, and a credential display module 1806, where the video playback module 1802 is configured to play a video on a video playback interface to which a first object is logged in;

the viewing marking prompt module 1804 is configured to acquire a local viewing marking record of the video and scene identifiers of markable scene clips in the video, compare the local viewing marking record with the scene identifiers, determine an unmarked first scene clip in the video, and display a first scene clip marking entry on the video playback interface in a case of playing to the first scene clip in the video, the first scene clip marking entry being configured for indicating performing viewing marking on the first scene clip; and the credential display module 1806 is configured to display a viewing marking credential for the first scene clip in response to a viewing marking trigger operation on the first scene clip marking entry, the displayed viewing marking credential covering a part of the video playback interface, and the viewing marking credential being an independent operable object, and including description information of the video and identity information of the first object.

Based on the foregoing video-based interaction apparatus, by playing a video on a video playback interface to which a first object is logged in; acquiring a local viewing marking record of the video and scene identifiers of markable scene clips in the video, and comparing the local viewing marking record with the scene identifiers, an unmarked first scene clip in the video can be determined; then when the video is played to the first scene clip, a first scene clip marking entry can be displayed on the video playback interface, which can indicate performing viewing marking on the first scene clip, so that a viewing marking credential for the first scene clip can be displayed in response to a viewing marking trigger operation on the first scene clip marking entry, to implement viewing marking on the first scene clip, the viewing marking credential being an independent operable object, and including description information of the video and identity information of the first object; and by performing viewing marking on the first scene clip, and displaying the viewing marking credential for the first scene clip, accurate recording of the video followed by the first object can be implemented, thereby helping the first object to quickly search for the followed video based on the viewing marking credential, and improving the efficiency of searching for the followed video. In addition, the form of displaying the first scene clip marking entry and displaying the viewing marking credential in response to a first scene clip marking trigger operation can improve the interest of the viewing marking and viewing data; and by displaying the viewing marking credential after providing the viewing marking in the viewing process, memories can be left for the first object's viewing, the user experience can be improved, and the interaction threshold can be lowered, thereby allowing content accumulation on the first object's personal page and strengthening the first object's image.

In an embodiment, the viewing marking prompt module is further configured to display a current playback picture marking entry on the video playback interface in response to a playback control trigger event in a playback process of the video, the current playback picture marking entry being configured for indicating performing viewing marking on a current playback picture; and the credential display module is further configured to display a viewing marking credential for the current playback picture in response to a viewing marking trigger operation on the current playback picture marking entry.

In an embodiment, the viewing marking prompt module is further configured to display a first scene clip marking entry on the video playback interface in a case of playing to the first scene clip in the video, the first scene clip marking entry being configured for indicating performing viewing marking on the first scene clip; and the credential display module is further configured to display a viewing marking credential for the first scene clip in response to a viewing marking trigger operation on the first scene clip marking entry.

In an embodiment, the credential display module is further configured to display, in response to a selection operation on the displayed viewing marking credential, obtained credentials for a corresponding work to which the video belongs, and highlight at least one of the obtained credentials; and highlight, in response to a credential switch display event, a first credential to which the credential switch display event points.

In an embodiment, the video-based interaction apparatus further includes a credential interaction module, where the credential interaction module is configured to display a credential interaction entry, the credential interaction entry being configured for prompting interaction with the at least one of the obtained credentials; and interact, in response to a credential interaction trigger event, with a credential to which the credential interaction trigger event points, and display a credential interacted prompt.

In an embodiment, the video-based interaction apparatus further includes a record viewing module, where the record viewing module is configured to display a video application interface to which a login object is logged in; display a video application homepage of the first object in response to a homepage viewing trigger event for the first object; display, in a case that a viewing marking record of the first object is in a visible state, a record viewing entry of the viewing marking record on the displayed video application homepage; and display the viewing marking record of the first object in response to a record viewing trigger event for the record viewing entry.

In an embodiment, the record viewing entry includes a viewing calendar, the viewing calendar displaying at least some of viewing marking records in a calendar form.

In an embodiment, the record viewing module is further configured to display the viewing marking record of the first object in response to the record viewing trigger event for the record viewing entry, the viewing marking record displaying viewing marking credentials by category by using movie and television works as a dimension; and display, in response to a credential viewing trigger event for a first movie and television work, a viewing marking credential list of the first movie and television work.

In an embodiment, the credential display module is further configured to display a viewing marking icon on the video playback interface, and display a marking success prompt pointing to the viewing marking icon, the viewing marking credential occupying a part of the marking success prompt. In an embodiment, the viewing marking prompt module is further configured to display an episode-based viewing marking entry on the video playback interface in a case of playing to a first position in the video, the episode-based viewing marking entry being configured for indicating performing viewing marking on an episode within which the video falls; and the credential display module is further configured to display, in response to a viewing marking trigger operation on the episode-based viewing marking entry, a viewing marking credential for the episode within which the video falls.

In an embodiment, the description information of the video includes a video representation image, the video representation image being a dynamic image, and including an image foreground part and an image background part; and the credential display module is further configured to display, in response to a dynamic display trigger event and along with a motion direction corresponding to the dynamic display trigger event, a video representation image in which the image foreground part is moved and the image background part remains unchanged, a movement direction of the image foreground part being the same as the motion direction.

In an embodiment, the credential display module is further configured to move the image foreground part based on the motion direction corresponding to the dynamic display trigger event; acquire an image inpainting result corresponding to the video representation image, and inpaint a hole between the moved image foreground part and the image background part based on the image inpainting result corresponding to the video representation image, to obtain the video representation image in which the image foreground part is moved and the image background part remains unchanged; and display the video representation image in which the image foreground part is moved and the image background part remains unchanged.

In an embodiment, the video-based interaction apparatus further includes an image inpainting result acquisition module, where the image inpainting result acquisition module is configured to extract a first video frame corresponding to the video representation image from the video; and perform depth estimation and image inpainting on the first video frame, to obtain the image inpainting result corresponding to the video representation image.

In an embodiment, the image inpainting result acquisition module is further configured to perform depth estimation on the first video frame, to obtain a depth estimation image; perform image format conversion on the depth estimation image, to obtain a converted image in a hierarchical depth image format; determine at least one edge region with a discontinuous depth in the converted image based on depth information at each pixel position in the converted image; and inpaint a pixel at each pixel position in the edge region based on a local region corresponding to the edge region, to obtain the image inpainting result corresponding to the video representation image.

In an embodiment, the process of the performing depth estimation and image inpainting on the first video frame, to obtain the image inpainting result corresponding to the video representation image is performed through a pre-trained image inpainting model; and the image inpainting result acquisition module is further configured to acquire at least one training video and an initial image inpainting model; acquire, for each video frame in the at least one training video, optical flow information between the targeted video frame and a next temporally adjacent video frame, perform depth estimation and image inpainting on the targeted video frame through the initial image inpainting model, to obtain a preliminary inpainting result corresponding to the targeted video frame, and obtain a loss function value corresponding to the targeted video frame based on the optical flow information and the preliminary inpainting result; and perform parameter adjustment on the initial image inpainting model based on the loss function value corresponding to each video frame in the at least one training video, to obtain the pre-trained image inpainting model.

In an embodiment, the image inpainting result acquisition module is further configured to compare the targeted video frame with a preliminary inpainted image corresponding to the preliminary inpainting result, to obtain a first loss function value; determine at least one edge pixel position at an image depth edge and a plurality of adjacent pixel positions corresponding to the at least one edge pixel position respectively in the targeted video frame based on the preliminary inpainting result; respectively calculate, for each first edge pixel position in the at least one edge pixel position, displacement vectors between the first edge pixel position and a plurality of first adjacent pixel positions corresponding to the first edge pixel position, acquire an optical flow vector of the first edge pixel position from the optical flow information, and obtain a consistency loss function value corresponding to the first edge pixel position based on the displacement vectors and the optical flow vector; obtain a second loss function value based on the consistency loss function value corresponding to each edge pixel position; and weight the first loss function value and the second loss function value, to obtain the loss function value corresponding to the targeted video frame.

In an embodiment, the credential display module is further configured to update the local viewing marking record based on the first scene clip in response to the viewing marking trigger operation on the first scene clip marking entry, and transmit a credential information acquisition request; receive first credential information corresponding to the credential information acquisition request; and display the viewing marking credential for the first scene clip based on the first credential information.

The modules in the foregoing video-based interaction apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided, and the computer device may be a terminal or a server. In this embodiment, a description is provided by using an example in which the computer device is a terminal, and an internal structure diagram of the terminal may be shown in FIG. 19. The computer device includes a processor, a memory, an input/output interface, a communication interface, a display screen, and an input apparatus. The processor, the memory, and the input/output interface are connected to each other by a system bus, and the communication interface, the display unit, and the input apparatus are connected to the system bus by the input/output interface. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The input/output interface of the computer device is configured to exchange information between the processor and an external device. The communication interface of the computer device is configured to communicate with an external terminal in a wired or wireless manner, and the wireless manner may be implemented by using Wi-Fi, a mobile cellular network, near field communication (NFC), or other technologies. The computer-readable instructions are executed by the processor to implement a video-based interaction method. The display unit of the computer device is configured to form a visible picture, which may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 19:
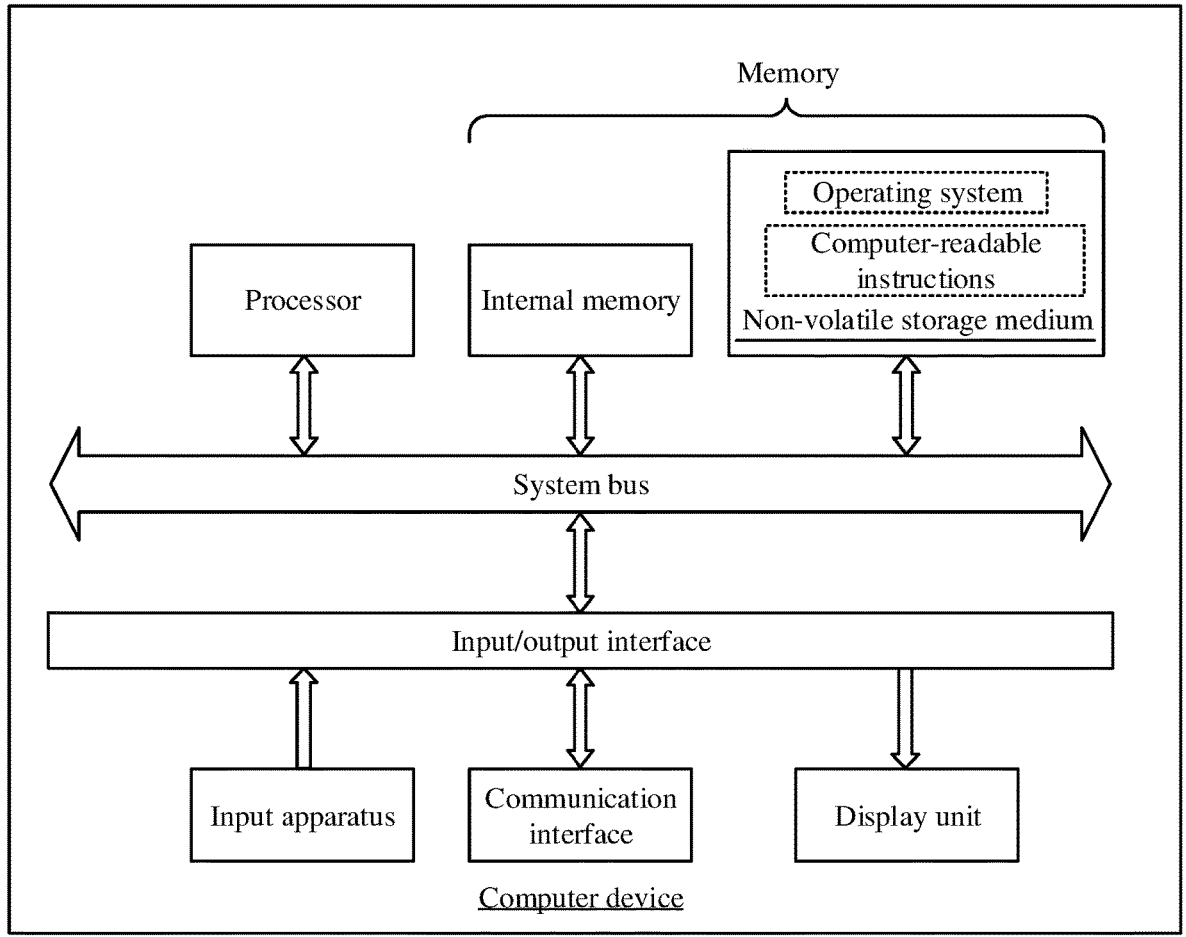
FIG. 19 is a diagram of an internal structure of a computer device according to an embodiment.

A person skilled in the art may understand that, the structure shown in FIG. 19 is only a block diagram of a partial structure related to the solution of this application, and does not limit the computer device to which the solution of this application is applied. Specifically, the specific computer device may include more components or fewer components than those shown in the figure, or some components may be combined, or a different component deployment may be used.

In an embodiment, a computer device is further provided, including a memory and a processor, the memory storing computer-readable instructions, the processor, when executing the computer-readable instructions, implementing the steps in the foregoing method embodiments.

In an embodiment, a computer-readable storage medium is provided, storing computer-readable instructions, the computer-readable instructions, when executed by a processor, implementing the steps in the foregoing method embodiments.

In an embodiment, a computer program product is provided, including computer-readable instructions, the computer-readable instructions, when executed by a processor, implementing the steps in the foregoing method embodiments.

Both user information (including but not limited to identity information of the first object) and data (including but not limited to data used for analysis, stored data, and displayed data) involved in this application are information and data authorized by the user or fully authorized by all parties, and the collection, use, and processing of relevant data need to comply with relevant laws, regulations and standards of relevant countries and regions.

A person of ordinary skill in the art may understand that all or some procedures in the method in the foregoing embodiments may be implemented by computer-readable instructions instructing related hardware. The computer-readable instructions may be stored in a non-volatile computer-readable storage medium, and when the computer-readable instructions are executed, the procedures in the foregoing method embodiments may be implemented. Any reference to a memory, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, and the like. The volatile memory may include a random access memory (RAM), an external cache, or the like. For the purpose of description instead of limitation, the RAM is available in a plurality of forms, such as a static RAM (SRAM) or a dynamic RAM (DRAM). The databases involved in the embodiments provided in this application may include at least one of relational databases or non-relational databases. The non-relational databases may include blockchain-based distributed databases and the like, and are not limited thereto. The processors involved in the embodiments provided in this application may be general-purpose processors, central processing units, graphics processors, digital signal processors, programmable logic devices, quantum computing-based data processing logic devices, and the like, and are not limited thereto.

Various technical features in the foregoing embodiments may be combined in different manners to form other embodiments. For a concise description, possible combinations of various technical features in the foregoing embodiments are not all described. However, the combinations of the technical features are to be considered as falling within the scope recorded in this specification provided that the combinations of the technical features do not conflict with each other.

The foregoing embodiments show only several implementations of this application and are described in detail, which, however, are not to be construed as a limitation to the patent scope of this application. For a person of ordinary skill in the art, several transformations and improvements can be made without departing from the idea of this application, which all fall within the protection scope of this application. Therefore, the protection scope of this application is subject to the protection scope of the appended claims.

What is claimed is:

1. A video-based interaction method, performed by a computer device, comprising:
    playing a video on a video playback interface to which a target object is logged in;
    acquiring a local viewing marking record of the video and scene identifiers of markable scene clips in the video;
    comparing the local viewing marking record with the scene identifiers to determine an unmarked target scene clip in the video;
    displaying a target scene clip marking entry on the video playback interface in response to playing to the target scene clip in the video, the target scene clip marking entry indicating performing viewing marking on the target scene clip; and
    displaying a viewing marking credential for the target clip in response to a viewing marking trigger operation on the target scene clip marking entry, the viewing marking credential covering a part of the video playback interface, and the viewing marking credential being an independent operable object and including description information of the video and identity information of the target object.

2. The method according to claim 1, further comprising:
    displaying an episode-based viewing marking entry on the video playback interface in response to playing to a target position in the video, the episode-based viewing marking entry indicating performing viewing marking on an episode within which the video falls; and
    displaying, in response to a viewing marking trigger operation on the episode-based viewing marking entry, a viewing marking credential for the episode within which the video falls.

3. The method according to claim 1, further comprising:
    displaying a current playback picture marking entry on the video playback interface in response to a playback control trigger event in a playback process of the video, the current playback picture marking entry indicating performing viewing marking on a current playback picture; and
    displaying a viewing marking credential for the current playback picture in response to a viewing marking trigger operation on the current playback picture marking entry.

4. The method according to claim 1, further comprising:
    displaying, in response to a selection operation on the viewing marking credential, obtained credentials for a corresponding work to which the video belongs, and highlighting at least one of the obtained credentials; and
    highlighting, in response to a credential switch display event, a credential to which the credential switch display event points.

5. The method according to claim 4, further comprising:
    displaying a credential interaction entry, the credential interaction entry prompting interaction with the at least one of the obtained credentials; and
    interacting, in response to a credential interaction trigger event, with a credential to which the credential interaction trigger event points, and displaying a credential interacted prompt.

6. The method according to claim 1, further comprising:
    displaying a video application interface to which a login object is logged in;
    displaying a video application homepage of the target object in response to a homepage viewing trigger event for the target object;
    displaying, in response to a viewing marking record of the target object being in a visible state, a record viewing entry of the viewing marking record on the video application homepage; and
    displaying the viewing marking record of the target object in response to a record viewing trigger event for the record viewing entry.

7. The method according to claim 6, wherein displaying the viewing marking record of the target object in response to the record viewing trigger event for the record viewing entry includes:
    displaying the viewing marking record of the target object in response to the record viewing trigger event for the record viewing entry, the viewing marking record displaying viewing marking credentials by category by using movie and television works as a dimension; and
    displaying, in response to a credential viewing trigger event for a target movie and television work, a viewing marking credential list of the target movie and television work.

8. The method according to claim 1, wherein:
    the description information of the video includes a video representation image, the video representation image being a dynamic image and including an image foreground part and an image background part; and
    displaying the viewing marking credential includes:
        displaying, in response to a dynamic display trigger event and along with a motion direction corresponding to the dynamic display trigger event, a video representation image in which the image foreground part is moved and the image background part remains unchanged, a movement direction of the image foreground part being same as the motion direction.

9. The method according to claim 8, wherein displaying, along with the motion direction corresponding to the dynamic display trigger event, the video representation image in which the image foreground part is moved and the image background part remains unchanged includes:
    moving the image foreground part based on the motion direction corresponding to the dynamic display trigger event;
    acquiring an image inpainting result corresponding to the video representation image, and inpainting a hole between the moved image foreground part and the image background part based on the image inpainting result corresponding to the video representation image, to obtain the video representation image in which the image foreground part is moved and the image background part remains unchanged; and displaying the video representation image in which the image foreground part is moved and the image background part remains unchanged.

10. The method according to claim 9, further comprising:

generating the image inpainting result corresponding to the video representation image, including:

extracting a target video frame corresponding to the video representation image from the video; and performing depth estimation and image inpainting on the target video frame, to obtain the image inpainting result corresponding to the video representation image.

11. The method according to claim 10, wherein performing the depth estimation and image inpainting on the target video frame to obtain the image inpainting result corresponding to the video representation image includes:

performing depth estimation on the target video frame, to obtain a depth estimation image;

performing image format conversion on the depth estimation image, to obtain a converted image in a hierarchical depth image format;

determining at least one edge region with a discontinuous depth in the converted image based on depth information at each pixel position in the converted image; and inpainting a pixel at each pixel position in the edge region based on a local region corresponding to the edge region, to obtain the image inpainting result corresponding to the video representation image.

12. The method according to claim 10, wherein the depth estimation and image inpainting on the target video frame is performed through a pre-trained image inpainting model;

the method further comprising:

performing training operations to obtain the pre-trained image inpainting model, including:

acquiring at least one training video and an initial image inpainting model;

acquiring, for each video frame in the at least one training video, optical flow information between a targeted video frame and a next temporally adjacent video frame, performing depth estimation and image inpainting on the targeted video frame through the initial image inpainting model, to obtain a preliminary inpainting result corresponding to the targeted video frame, and obtaining a loss function value corresponding to the targeted video frame based on the optical flow information and the preliminary inpainting result; and performing parameter adjustment on the initial image inpainting model based on the loss function value corresponding to each video frame in the at least one training video, to obtain the pre-trained image inpainting model.

13. The method according to claim 12, wherein obtaining the loss function value corresponding to the targeted video frame based on the optical flow information and the preliminary inpainting result includes:

comparing the targeted video frame with a preliminary inpainted image corresponding to the preliminary inpainting result, to obtain a first loss function value;

determining at least one edge pixel position at an image depth edge and a plurality of adjacent pixel positions corresponding to the at least one edge pixel position in the targeted video frame based on the preliminary inpainting result;

calculating, for each target edge pixel position in the at least one edge pixel position, displacement vectors between the target edge pixel position and a plurality of target adjacent pixel positions corresponding to the target edge pixel position, acquiring an optical flow vector of the target edge pixel position from the optical flow information, and obtaining a consistency loss function value corresponding to the target edge pixel position based on the displacement vectors and the optical flow vector;

obtaining a second loss function value based on the consistency loss function value corresponding to each edge pixel position; and weighting the first loss function value and the second loss function value, to obtain the loss function value corresponding to the targeted video frame.

14. The method according to claim 1, wherein displaying the viewing marking credential for the target scene clip in response to the viewing marking trigger operation on the target scene clip marking entry includes:

updating the local viewing marking record based on the target scene clip in response to the viewing marking trigger operation on the target scene clip marking entry, and transmitting a credential information acquisition request;

receiving credential information corresponding to the credential information acquisition request; and displaying the viewing marking credential for the target scene clip based on the credential information.

15. A computer device comprising:

one or more memories storing one or more computer-readable instructions; and one or more processors configured to execute the one or more computer-readable instructions to:

play a video on a video playback interface to which a target object is logged in;

acquire a local viewing marking record of the video and scene identifiers of markable scene clips in the video;

compare the local viewing marking record with the scene identifiers to determine an unmarked target scene clip in the video;

display a target scene clip marking entry on the video playback interface in response to playing to the target scene clip in the video, the target scene clip marking entry indicating performing viewing marking on the target scene clip; and display a viewing marking credential for the target clip in response to a viewing marking trigger operation on the target scene clip marking entry, the viewing marking credential covering a part of the video playback interface, and the viewing marking credential being an independent operable object and including description information of the video and identity information of the target object.

16. The computer device according to claim 15, wherein the one or more processors are further configured to execute the one or more computer-readable instructions to:

display an episode-based viewing marking entry on the video playback interface in response to playing to a target position in the video, the episode-based viewing marking entry indicating performing viewing marking on an episode within which the video falls; and display, in response to a viewing marking trigger operation on the episode-based viewing marking entry, a viewing marking credential for the episode within which the video falls.

17. The computer device according to claim 15, wherein the one or more processors are further configured to execute the one or more computer-readable instructions to:

display a current playback picture marking entry on the video playback interface in response to a playback control trigger event in a playback process of the video, the current playback picture marking entry indicating performing viewing marking on a current playback picture; and display a viewing marking credential for the current playback picture in response to a viewing marking trigger operation on the current playback picture marking entry.

18. The computer device according to claim 15, wherein the one or more processors are further configured to execute the one or more computer-readable instructions to:

display, in response to a selection operation on the viewing marking credential, obtained credentials for a corresponding work to which the video belongs, and highlighting at least one of the obtained credentials; and highlight, in response to a credential switch display event, a credential to which the credential switch display event points.

19. The computer device according to claim 18, wherein the one or more processors are further configured to execute the one or more computer-readable instructions to:

display a credential interaction entry, the credential interaction entry prompting interaction with the at least one of the obtained credentials; and interact, in response to a credential interaction trigger event, with a credential to which the credential interaction trigger event points, and display a credential interacted prompt.

20. A non-transitory computer-readable storage medium, storing one or more computer-readable instructions that, when executed by one or more processors, cause the one or more processors to:

play a video on a video playback interface to which a target object is logged in;

acquire a local viewing marking record of the video and scene identifiers of markable scene clips in the video;

compare the local viewing marking record with the scene identifiers to determine an unmarked target scene clip in the video;

display a target scene clip marking entry on the video playback interface in response to playing to the target scene clip in the video, the target scene clip marking entry indicating performing viewing marking on the target scene clip; and display a viewing marking credential for the target clip in response to a viewing marking trigger operation on the target scene clip marking entry, the viewing marking credential covering a part of the video playback interface, and the viewing marking credential being an independent operable object and including description information of the video and identity information of the target object.

* * * * *